(12) United States Patent
Akita et al.

(10) Patent No.: US 9,534,548 B2
(45) Date of Patent: Jan. 3, 2017

(54) VAPORIZED FUEL PROCESSING APPARATUS

(71) Applicant: AISAN KOGYO KABUSHIKI KAISHA, Obu-shi, Aichi-ken (JP)

(72) Inventors: Minoru Akita, Ama (JP); Yoshikazu Miyabe, Nagoya (JP); Naoyuki Tagawa, Nagoya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 273 days.

(21) Appl. No.: 14/561,914

(22) Filed: Dec. 5, 2014

(65) Prior Publication Data
US 2015/0159566 A1 Jun. 11, 2015

(30) Foreign Application Priority Data
Dec. 6, 2013 (JP) ................... 2013-252872

(51) Int. Cl.
*G06F 19/00* (2011.01)
*F02D 41/00* (2006.01)
(Continued)

(52) U.S. Cl.
CPC ......... *F02D 41/003* (2013.01); *F02D 41/1402* (2013.01); *F02D 41/2441* (2013.01);
(Continued)

(58) Field of Classification Search
CPC combination set(s) only.
See application file for complete search history.

(56) References Cited

U.S. PATENT DOCUMENTS 6,431,156 B1 * 8/2002 Murakami ............. F02M 25/08
 123/516
6,990,963 B2 * 1/2006 Hara .................... F02M 25/089
 123/198 D
(Continued)

FOREIGN PATENT DOCUMENTS

DE 19838959 A1 3/2000
DE 102010014558 A1 10/2011
(Continued)

OTHER PUBLICATIONS

German Patent Application No. DE 10 2014 017 158.2 Office Action dated Jun. 16, 2015 (7 pages).

*Primary Examiner* — Kidest Bahta
(74) *Attorney, Agent, or Firm* — Conley Rose, P.C.

(57) ABSTRACT

A vaporized fuel processing apparatus has a closing valve provided in a vapor path connecting an adsorbent canister to the fuel tank, a pressure sensor configured to detect the inner pressure of the fuel tank, and an electric control unit configured to determine whether the amount of increase in the inner pressure of the fuel tank is within an acceptable range or not, to learn a valve opening start position of the closing valve when the inner pressure of the fuel tank is reduced by an amount not less than a predetermined value, and to stop or prohibit the learning of the valve opening start position of the closing valve when the amount of increase in the inner pressure of the fuel tank is not within the acceptable range during or before the learning of the valve opening start position of the closing valve.

12 Claims, 16 Drawing Sheets

(51) Int. Cl.
*F02D 41/14* (2006.01)
*F02D 41/24* (2006.01)
*F02M 25/08* (2006.01)

(52) U.S. Cl.
CPC ......... *F02D 41/2464* (2013.01); *F02M 25/08* (2013.01); *F02D 41/004* (2013.01); *Y10T 137/7762* (2015.04)

(56) References Cited

U.S. PATENT DOCUMENTS

| | | | | |
|---|---|---|---|---|
| 7,849,837 | B2 * | 12/2010 | Hasebe | ............ F02M 25/0854 123/198 E |
| 8,375,925 | B2 * | 2/2013 | Ichikawa | ............ F02D 41/003 123/519 |
| 8,528,528 | B2 * | 9/2013 | Fukui | .................. F02D 41/004 123/516 |
| 8,607,765 | B2 | 12/2013 | Hagen | |
| 2007/0068227 | A1 * | 3/2007 | Tsuyuki | ............ F02M 25/0809 73/49.7 |
| 2011/0296997 | A1 | 12/2011 | Sugiura | |
| 2014/0102420 | A1 | 4/2014 | Kimoto et al. | |

FOREIGN PATENT DOCUMENTS

| | | |
|---|---|---|
| DE | 102013016984 A1 | 4/2014 |
| JP | 05-33729 A | 2/1993 |
| JP | 08-74678 A | 3/1996 |
| JP | 10-299583 A | 11/1998 |
| JP | 10-299586 A | 11/1998 |
| JP | 2004-156496 A | 6/2004 |
| JP | 2004-308483 A | 11/2004 |
| JP | 2005-155323 A | 6/2005 |
| JP | 2010-281258 A | 12/2010 |
| JP | 2011-256778 A | 12/2011 |
| JP | 2013-104316 A | 5/2013 |
| JP | 2013-113198 A | 6/2013 |

* cited by examiner

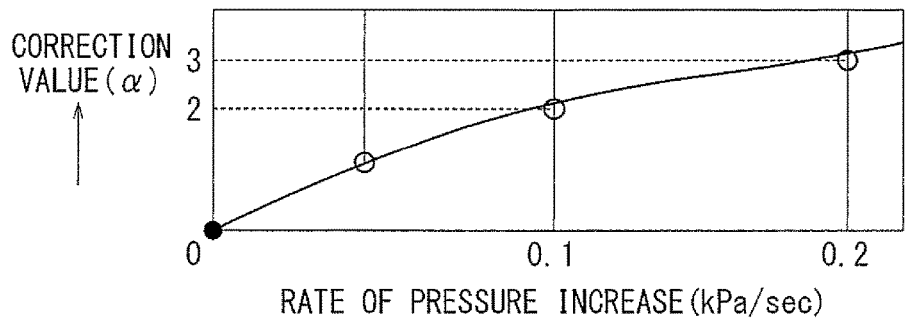

FIG. 18

| RATE OF PRESSURE INCREASE(kPa/sec) | 0 | 0.1 | 0.2 | 0.3 | 0.5 |
|---|---|---|---|---|---|
| CORRECTION VALUE($\alpha$) | 1 | 2 | 3 | 4 | 5 |

FIG. 19

CALCULATION METHOD OF CORRECTION VALUE $0 \leqq$ RATE OF PRESSURE INCREASE $< 0.1 \rightarrow$ CORRECTION VALUE=1step $0.1 \leqq$ RATE OF PRESSURE INCREASE $< 0.2 \rightarrow$ CORRECTION VALUE=2step $0.2 \leqq$ RATE OF PRESSURE INCREASE $< 0.3 \rightarrow$ CORRECTION VALUE=3step $0.3 \leqq$ RATE OF PRESSURE INCREASE $< 0.5 \rightarrow$ CORRECTION VALUE=4step $0.5 \leqq$ RATE OF PRESSURE INCREASE $\rightarrow$ CORRECTION VALUE=5step

FIG. 20

VAPORIZED FUEL PROCESSING APPARATUS

CROSS-REFERENCE TO RELATED APPLICATIONS

This application claims priority to Japanese patent application serial number 2013-252872, filed Dec. 6, 2013, the contents of which are incorporated herein by reference.

STATEMENT REGARDING FEDERALLY SPONSORED RESEARCH OR DEVELOPMENT

Not applicable.

BACKGROUND

This disclosure relates to a vaporized fuel processing apparatus including a canister equipped with an adsorbent adsorbing vaporized fuel generated in a fuel tank, and a closing valve provided in a vapor path connecting the canister and the fuel tank to each other.

A pertinent conventional vaporized fuel processing apparatus is disclosed in Japanese Laid-Open Patent Publication No. 2011-256778. The vaporized fuel processing apparatus according to Japanese Laid-Open Patent Publication No. 2011-256778 is equipped with a closing valve (control valve) provided in a vapor path connecting the canister and the fuel tank to each other. The closing valve is equipped with a dead zone region (valve-closing region) shutting off the vaporized fuel, and a conduction region (valve-opening region) allowing the vaporized fuel to pass; in the valve closing state, the fuel tank is maintained in a hermetic state; and, in the valve opening state, the vaporized fuel in the fuel tank is caused to escape to the canister side, making it possible to lower the inner pressure of the fuel tank. In the vaporized fuel processing apparatus according to Japanese Laid-Open Patent Publication No. 2011-256778, learning control is performed as follows. The degree of opening of the closing valve is changed in the opening direction at a predetermined speed from the valve-closing position; and when the inner pressure of the fuel tank begins to be reduced, the degree of opening of the closing valve is stored as the valve opening start position.

However, for example, when an internal combustion engine is stopped after high-load driving of a vehicle, the amount of the vaporized fuel generated in the fuel tank is large, so that the amount of increase in the inner pressure of the fuel tank is large. When the learning control described above is performed in such state, there is a possibility that the inner pressure of the fuel tank does not decrease by higher than a predetermined value. In such case, the valve opening start position for the closing valve would be erroneously learned. Accordingly, there has been a need for improved vaporized fuel processing apparatuses.

BRIEF SUMMARY

In one aspect of this disclosure, a vaporized fuel processing apparatus has a canister capable of adsorbing vaporized fuel generated in a fuel tank, a vapor path connecting the canister and the fuel tank to each other, a closing valve provided in the vapor path and having a valve seat and a valve movable portion, a pressure sensor configured to detect the inner pressure of the fuel tank, and an electric control unit. The valve movable portion has an axis and is capable of moving in an axial direction of the valve movable portion respect to the valve seat. The closing valve is in a valve closing state capable of maintaining the fuel tank in a hermetic state when a stroke amount which is an axial distance between the valve movable portion and the valve seat is within a predetermined range as from zero. The electric control unit is configured to determine whether the amount of increase in the inner pressure of the fuel tank is within an acceptable range or not, to learn a valve opening start position of the closing valve based on the stroke amount when the inner pressure of the fuel tank is reduced by an amount not less than (i.e., greater than or equal to) a predetermined value through changing of the stroke amount in the valve opening direction, and to stop or prohibit the learning of the valve opening start position of the closing valve when the amount of increase in the inner pressure of the fuel tank is not within the acceptable range during or before the learning of the valve opening start position of the closing valve.

According to the aspect of this disclosure, the electric control unit determines that the amount of increase in the inner pressure of the fuel tank is beyond the acceptable range during or before the learning of the valve opening start position of the closing valve, the learning of the valve opening start position is stopped or prohibited. Accordingly, when the amount of increase in the inner pressure of the fuel tank is large, the learning of the valve opening start position is not performed in order to prevent erroneous learning.

BRIEF DESCRIPTION OF THE DRAWINGS

FIG. 18 is a graph illustrating the correction value of a learning value of the valve opening start position of the closing valve;

FIG. 19 is a table illustrating the correction value of the learning value of the valve opening start position of the closing valve;

FIG. 20 is a table illustrating a calculation method for the correction value of the learning value of the valve opening start position of the closing valve.

DETAILED DESCRIPTION

Each of the additional features and teachings disclosed above and below may be utilized separately or in conjunction with other features and teachings to provide improved vaporized fuel processing apparatuses. Representative examples, which utilize many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary in the broadest sense, and are instead taught merely to particularly describe representative examples. Moreover, various features of the representative examples and the dependent claims may be combined in ways that are not specifically enumerated in order to provide additional useful embodiments of the present teachings.

Figure 1:
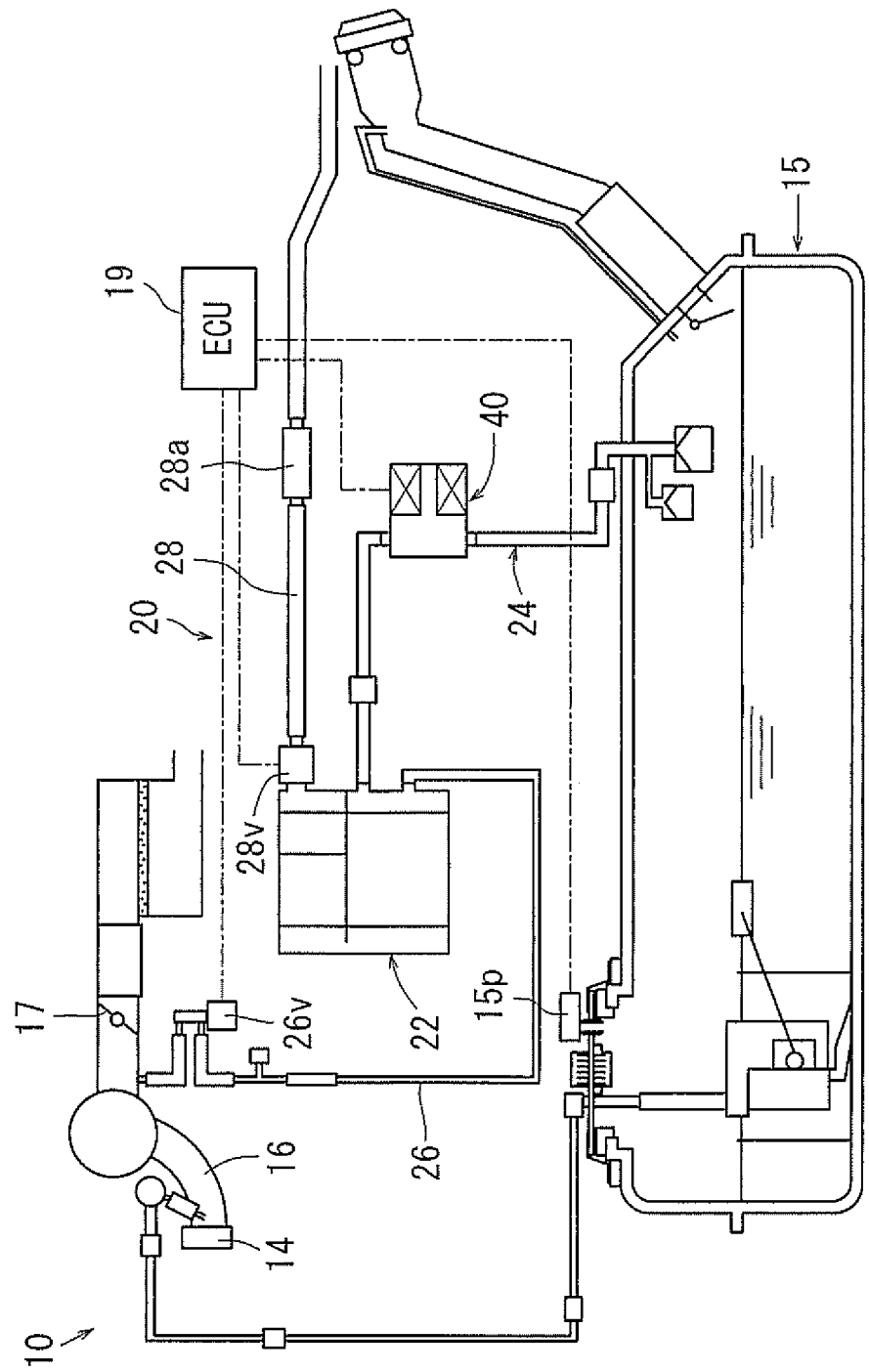
FIG. 1 is a diagram illustrating the construction of a vaporized fuel processing apparatus according to a first embodiment of this disclosure.

A vaporized fuel processing apparatus 20 according to a first embodiment of this disclosure will be described with reference to FIGS. 1 through 4. As shown in FIG. 1, the vaporized fuel processing apparatus 20 of the present embodiment is provided in a vehicle engine system 10 and is configured to prevent leakage of vaporized fuel from a fuel tank 15 of the vehicle to the exterior.

As shown in FIG. 1, the vaporized fuel processing apparatus 20 is equipped with a canister 22, a vapor path 24 connected to the canister 22, a purge path 26, and an atmosphere path 28. The canister 22 is loaded with activated carbon (not shown) as the adsorbent, and vaporized fuel which has been generated in the fuel tank 15 is adsorbed by the adsorbent. One end portion (upstream side end portion) of the vapor path 24 communicates with a gaseous layer portion in the fuel tank 15, and the other end portion (downstream side end portion) of the vapor path 24 communicates with the interior of the canister 22. At some midpoint of the vapor path 24, there is provided a closing valve 40 (described below) configured to allow/prohibit communication through the vapor path 24. One end portion (upstream side end portion) of the purge path 26 communicates with the interior of the canister 22, and the other end portion (downstream side end portion) of the purge path 26 communicates with the path portion on the downstream side of a throttle valve 17 in an intake path 16 of an engine 14.

At some midpoint of the purge path 26, there is provided a purge valve 26v configured to allow/prohibit communication through the purge path 26. Further, the canister 22 communicates with the atmosphere path 28 via an on-board diagnostics (OBD) component 28v for failure detection. At some midpoint of the atmosphere path 28, there is provided an air filter 28a, and the other end portion of the atmosphere path 28 is open to the atmosphere. The closing valve 40, the purge valve 26v, and the OBD component 28v are controlled based on signals from an electric control unit (ECU) 19. Further, signals from a tank inner pressure sensor 15p for detecting the pressure in the fuel tank 15, etc. are input to the ECU 19.

Next, the basic operation of the vaporized fuel processing apparatus 20 will be described. While the vehicle is at rest, the closing valve 40 is maintained in the closed state. Thus, no vaporized fuel flows into the canister 22 from the fuel tank 15. And, when an ignition switch of the vehicle is turned on while the vehicle is at rest, there is performed learning control in which the valve opening start position for the closing valve 40 is learned (as described below). Further, while the vehicle is at rest, the purge valve 26v is maintained in the closed state, and the purge path 26 is in the cut-off state, with the atmosphere path 28 being maintained in the communication state. While the vehicle is traveling, when a predetermined purge condition holds good, the ECU 19 performs a control operation for purging the vaporized fuel adsorbed by the canister 22. In this control operation, opening/closing control is performed on the purge valve 26v while allowing the canister 22 to communicate with the atmosphere via the atmosphere path 28. When the purge valve 26v is opened, the intake negative pressure of the engine 14 acts on the interior of the canister 22 via the purge path 26. As a result, air flows into the canister 22 via the atmosphere path 28. Further, when the purge valve 26v is opened, the closing valve 40 operates in the valve opening direction to perform depressurization control of the fuel tank 15. Thus, the gas flows into the canister 22 from the fuel tank 15 via the vapor path 24. As a result, the adsorbent in the canister 22 is purged by the air, etc. flowing into the canister 22, and the vaporized fuel separated from the adsorbent is guided to the intake path 16 of the engine 14 together with the air before being burnt in the engine 14.

Figure 2:
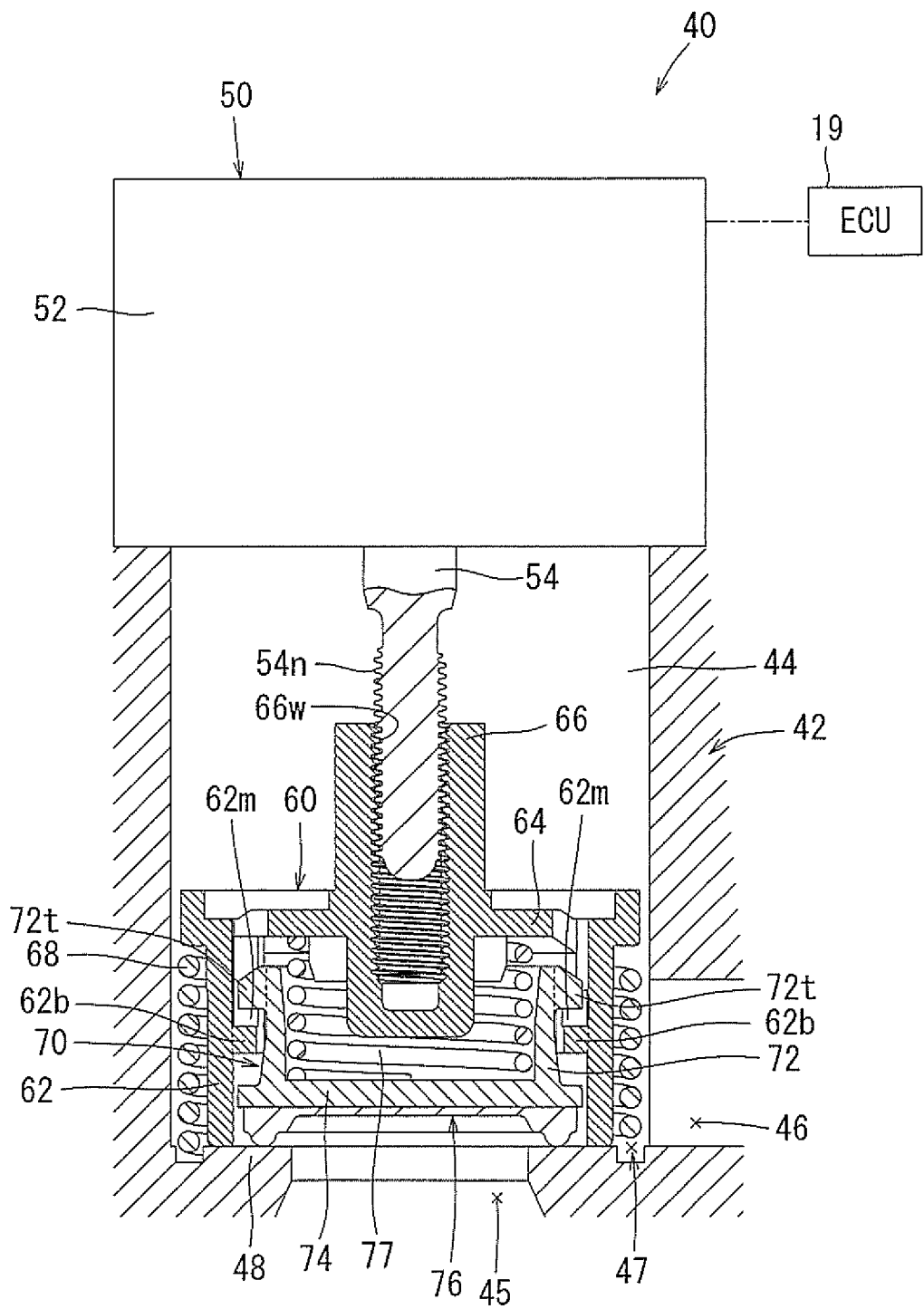
FIG. 2 is a longitudinal sectional view illustrating an initialization state of a closing valve used in the vaporized fuel processing apparatus.

The closing valve 40 is a flow rate control valve configured to close the vapor path 24 in the closed state, and to control the flow rate of the gas flowing through the vapor path 24 in the open state. As shown in FIG. 2, the closing valve 40 is equipped with a valve casing 42, a stepping motor 50, a valve guide 60, and a valve body 70. In the valve casing 42, there is formed a continuous, reverse L-shaped fluid passage 47 by a valve chamber 44, an inflow path 45, and an outflow path 46. A valve seat 48 is formed concentrically on the lower surface of the valve chamber 44, that is, at the port edge portion of the upper end opening of the inflow path 45. The stepping motor 50 is installed on top of the valve casing 42. The stepping motor 50 has a motor main body 52, and an output shaft 54 protruding from a lower surface of the motor main body 52 and capable of normal and reverse rotation. The output shaft 54 is concentrically arranged within the valve chamber 44 of the valve casing 42, and a male screw portion 54n is formed on the outer peripheral surface of the output shaft 54.

The valve guide 60 is formed as a topped cylinder by a cylindrical tubular wall portion 62 and an upper wall portion 64 closing the upper end opening of the tubular wall portion 62. At the central portion of the upper wall portion 64, there is concentrically formed a tubular shaft portion 66, and a female screw portion 66w is formed on the inner peripheral surface of the tubular shaft portion 66. The valve guide 60 is arranged so as to be movable in the axial direction (vertical direction) while prohibited from rotating around the axis by a detent means (not shown). The male screw portion 54n of the output shaft 54 of the stepping motor 50 is threadably engaged with the female screw portion 66w of the tubular shaft portion 66 of the valve guide 60 such that the valve guide 60 can be raised and lowered in the vertical direction (axial direction) based on the normal and reverse rotation of the output shaft 54 of the stepping motor 50. Around the valve guide 60, there is provided an auxiliary spring 68 urging the valve guide 60 upwardly.

The valve body 70 is formed as a bottomed cylinder composed of a cylindrical tubular wall portion 72 and a lower wall portion 74 closing the lower end opening of the tubular wall portion 72. A seal member 76 consisting, for example, of a disc-like member formed of a rubber-like elastic material is attached to a lower surface of the lower wall portion 74. The valve body 70 is concentrically arranged within the valve guide 60, and the seal member 76 of the valve body 70 is arranged so as to be capable of abutting an upper surface of the valve seat 48 of the valve casing 42. A plurality of connection protrusions 72t are circumferentially formed on the outer peripheral surface of the upper end portion of the tubular wall portion 72 of the valve body 70. The connection protrusions 72t of the valve body 70 are engaged with vertical-groove-like connection recesses 62m formed in the inner peripheral surface of the tubular wall portion 62 of the valve guide 60 so as to be capable of relative movement in the vertical direction by a fixed dimension. The valve guide 60 and the valve body 70 are integrally movable upwards (in the valve opening direction), with bottom wall portions 62b of the connection recesses 62m of the valve guide 60 abutting the connection protrusions 72t of the valve body 70 from below. Further, a valve spring 77 constantly urging the valve body 70 downwards, i.e., in the valve closing direction, with respect to the valve guide 60, is concentrically arranged between the upper wall portion 64 of the valve guide 60 and the lower wall portion 74 of the valve body 70.

Next, the basic operation of the closing valve 40 will be described. The closing valve 40 rotates the stepping motor 50 in the valve opening direction or in the valve closing direction by a predetermined number of steps based on an output signal from the ECU 19. When the stepping motor 50 rotates by the predetermined steps, the valve guide 60 moves by a predetermined stroke amount or distance in the vertical direction through threaded engagement action between the male screw portion 54n of the output shaft 54 of the stepping motor 50 and the female screw portion 66w of the tubular shaft portion 66 of the valve guide 60. In the above closing valve 40, setting is made, for example, such that, at the totally open position, the number of steps is approximately 200 and the stroke amount is approximately 5 mm. As shown in FIG. 2, in the initialized state (initial state) of the closing valve 40, the valve guide 60 is retained at the lower limit position, and the lower end surface of the tubular wall portion 62 of the valve guide 60 is in contact with the upper surface of the valve seat 48 of the valve casing 42. In this state, the connection protrusions 72t of the valve body 70 are situated above the bottom wall portions 62b of the connection recesses 62m of the valve guide 60, and the seal member 76 of the valve body 70 is pressed against the upper surface of the valve seat 48 of the valve casing 42 by the resilient force of the valve spring 77. That is, the closing valve 40 is maintained in the totally closed state. And, the number of steps of the stepping motor 50 at this time is 0, and the moving amount in the axial direction (upper direction) of the valve guide 60, i.e., the stroke amount in the valve opening direction, is 0 mm. While the vehicle is, for example, at rest, the stepping motor 50 of the closing valve 40 rotates, for example, by 4 steps in the valve opening direction from the initialized state. As a result, the valve guide 60 moves approximately 0.1 mm upwards due to the threaded engagement action between the male screw portion 54n of the output shaft 54 of the stepping motor 50 and the female screw portion 66w of the tubular shaft portion 66 of the valve guide 60, and is maintained in a state in which it is raised from the valve seat 48 of the valve casing 42. As a result, an excessive force is not easily applied between the valve guide 60 of the closing valve 40 and the valve seat 48 of the valve casing 42 due to a change in an environment factor such as temperature. In this state, the seal member 76 of the valve body 70 is pressed against the upper surface of the valve seat 48 of the valve casing 42 due to the resilient force of the valve spring 77.

Figure 3:
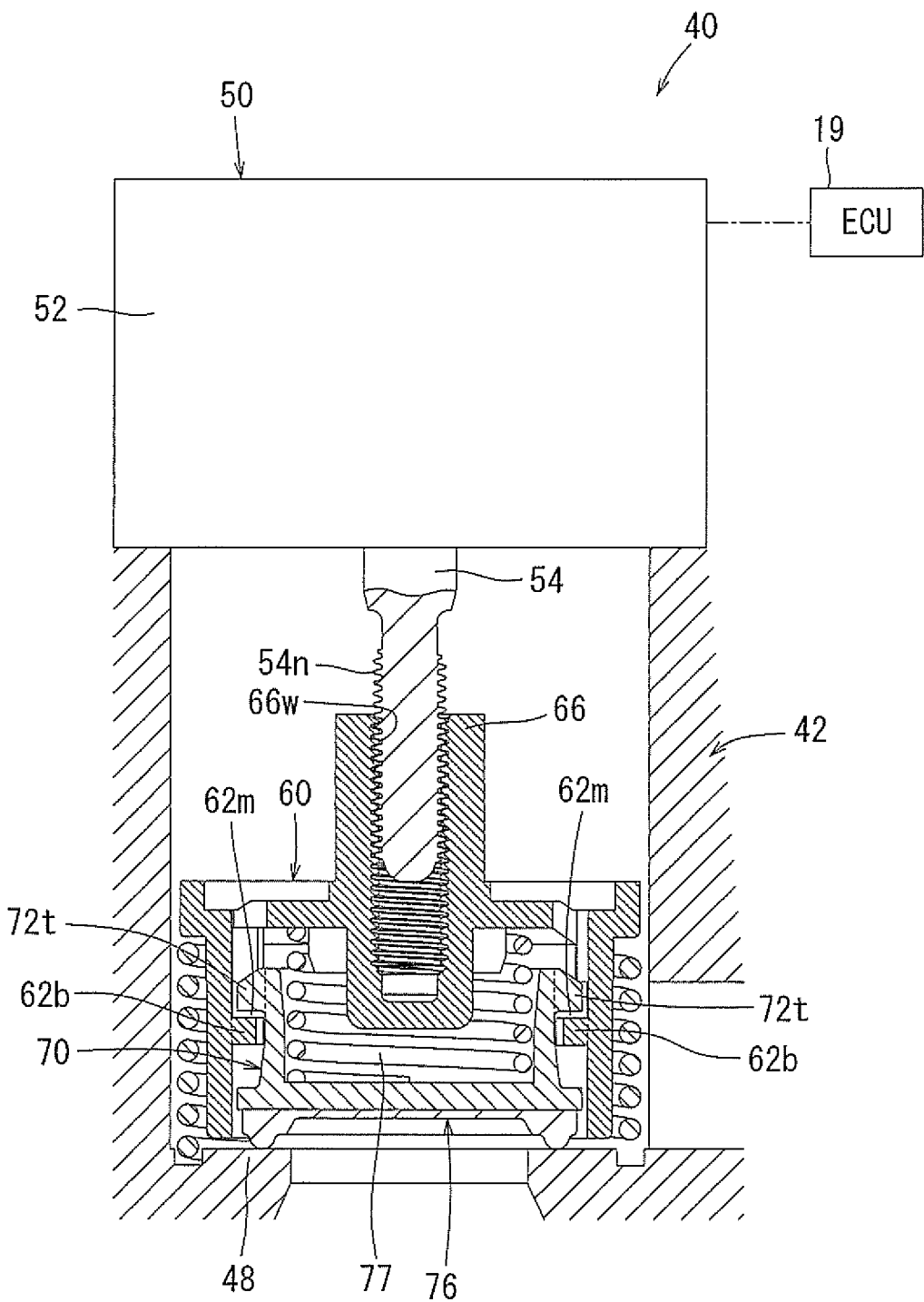
FIG. 3 is a longitudinal sectional view illustrating the valve closing state of the closing valve.
Figure 4:
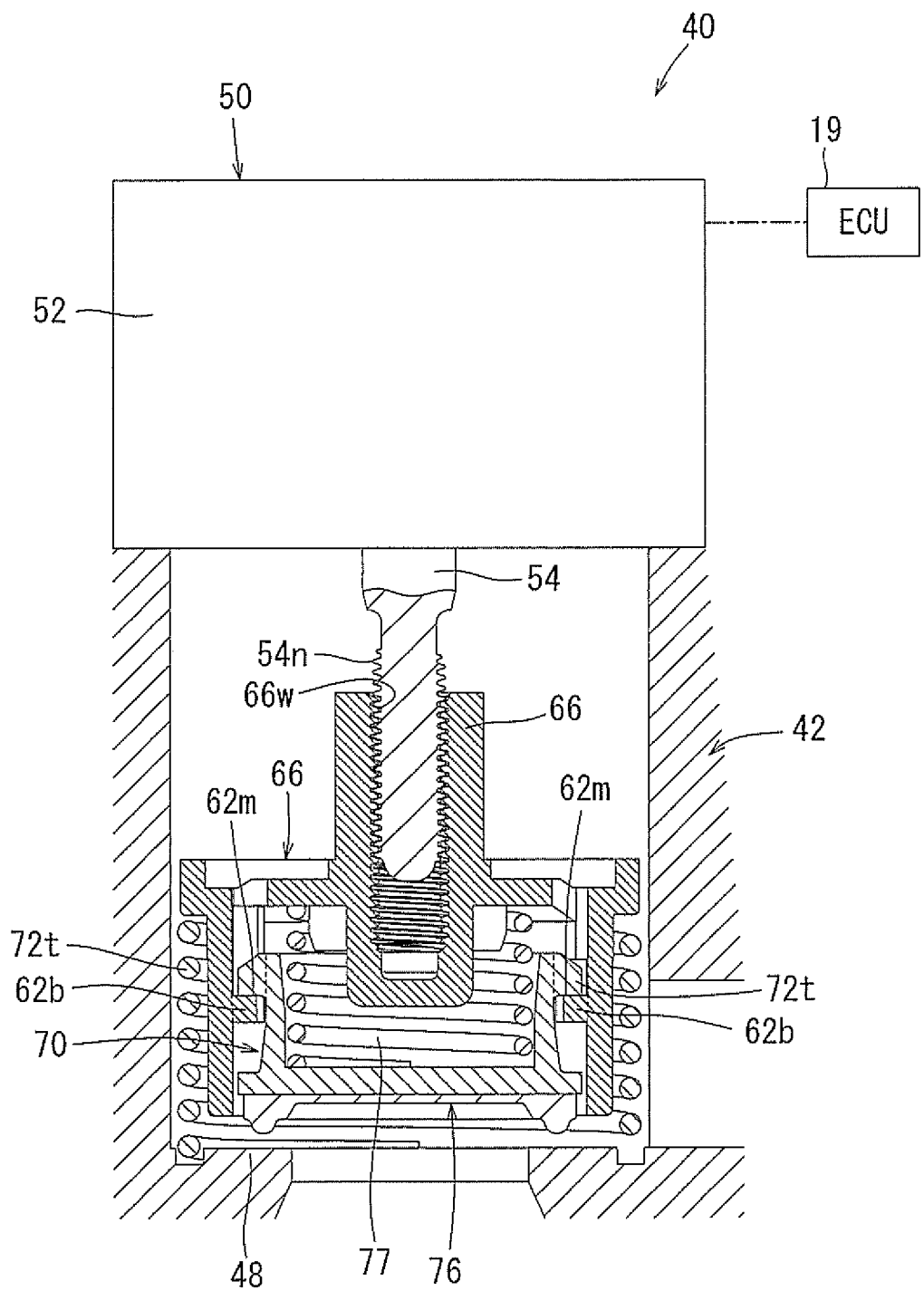
FIG. 4 is a longitudinal sectional view illustrating the valve opening state of the closing valve.
Figure 5:
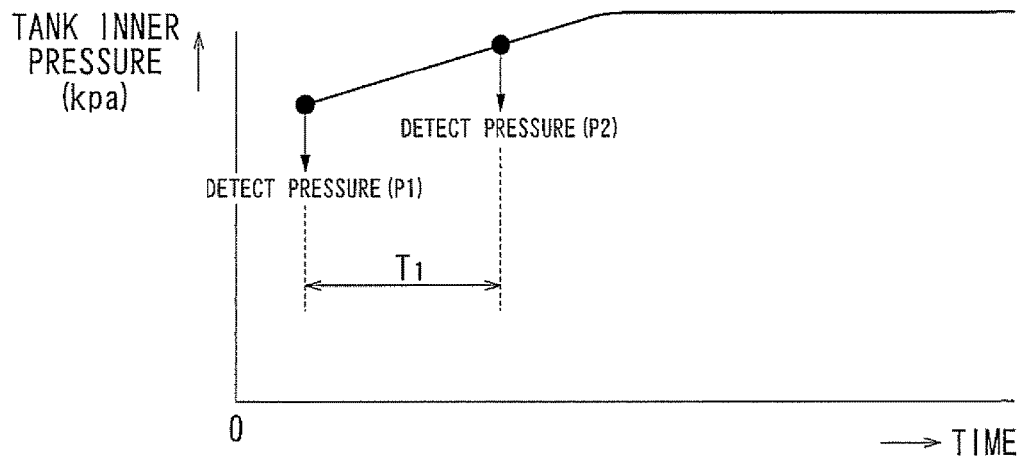
FIG. 5 is a graph illustrating change of the inner pressure of the fuel tank and timing of pressure detection.

When the stepping motor 50 further rotates in the valve opening direction from the position to which the stepping motor 50 has rotated by 4 steps, the valve guide 60 moves upwards due to the threaded engagement action between the male screw portion 54n and the female screw portion 66w and, as shown in FIG. 3, the bottom wall portions 62b of the connection recesses 62m of the valve guide 60 abut the connection protrusions 72t of the valve body 70 from below. As shown in FIG. 4, when the valve guide 60 moves further upwards, the valve body 70 moves upwards together with the valve guide 60, and the seal member 76 of the valve body 70 is separated from the valve seat 48 of the valve casing 42. As a result, the closing valve 40 is opened. Here, the valve opening start position for the closing valve 40 differs from product to product as a result of the positional tolerance of the connection protrusions 72t formed on the valve body 70, and the positional tolerance of the bottom wall portions 62b formed on the connection recesses 62m of the valve guide 60, etc., so that it is necessary to correctly learn the valve opening start position. This learning is performed through the learning control, and the number of steps of the valve opening start position is detected based on the timing with which the inner pressure of the fuel tank 15 is reduced by not less than (i.e., greater than or equal to) a predetermined value (ΔP1) while rotating the stepping motor 50 of the closing valve 40 in the valve opening direction (while increasing the number of steps). In this way, when the closing valve 40 is in the closed state, the valve guide 60 corresponds to the valve movable portion of this disclosure, and, when the closing valve 40 is in the open state, the valve guide 60 and the valve body 70 correspond to the valve movable portion of this disclosure.

Figure 6:
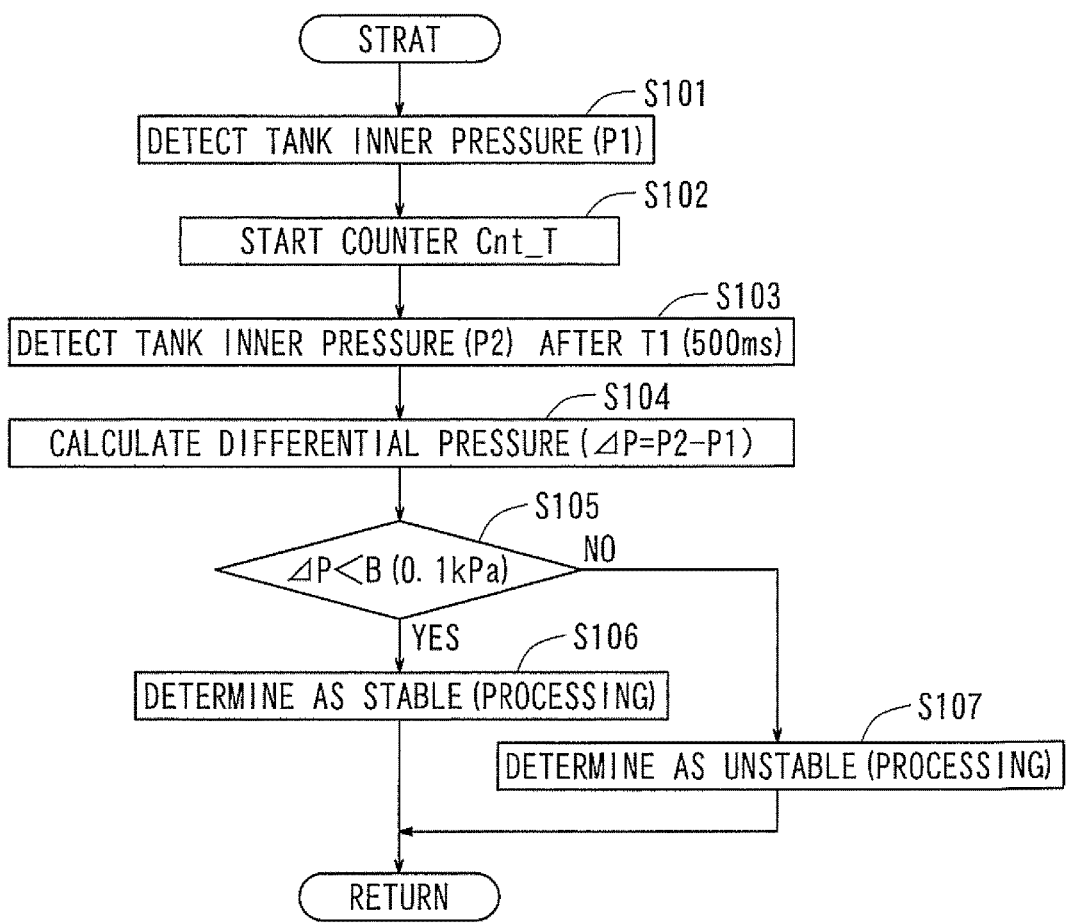
FIG. 6 is a flowchart for determining whether the fuel tank is in a tank stable state or in an unstable state based on the graph of FIG. 5.

Next, the determination of whether to perform the learning of the valve opening start position for the closing valve 40 will be described with reference to FIGS. 5 through 8. In a state that the amount of vaporized fuel generated in the fuel tank 15 is large and the amount of increase in the inner pressure of the fuel tank 15 is large, for example, shortly after stopping the engine following high loaded driving, there is a possibility that the inner pressure of the fuel tank 15 will not decrease by greater than or equal to the predetermined value (ΔP1) after opening the closing valve 40 due to the learning control. In such condition, the valve opening start position of the closing valve 40 would be erroneously learned, so that it is necessary to prohibit the learning control. The vaporized fuel processing apparatus 20 according to this embodiment determines whether to prohibit the learning based on the flowchart of FIG. 6. The operation shown in the flowchart of FIG. 6 is repeatedly performed at predetermined intervals based on a program stored in a storage device of the ECU 19. First, the tank inner pressure $P_1$ of the fuel tank 15 is detected at step S101 in FIG. 6 (refer to FIG. 5), and then a counter Cnt is started at step S102. Next, after an amount of time, for example, after T1=500 ms from the start of the counter Cnt, the inner pressure $P_2$ of the fuel tank 15 is detected (step S103). Then, calculation of the differential pressure between the tank inner pressure $P_1$ and the tank inner pressure $P_2$ is performed in order to calculate the differential pressure $\Delta P$ ($=P_2-P_1$) (step S104), and the differential pressure $\Delta P$ is compared with the decision value B (e.g., B=0.1 kPa) (step S105). When the differential pressure $\Delta P$ is lower than the decision value B (step S105, "YES"), it is determined as the tank stable state (step S106). When it is determined as the tank stable state, because the amount of increase in the inner pressure of the fuel tank 15 is within the acceptable range, the learning control of the valve opening start position of the closing valve 40 is performed. Alternatively, when the differential pressure $\Delta P$ is higher than the decision value B (step S105, "NO"), it is determined as the tank unstable state (step S107). When it is determined as the tank unstable state, because the amount of increase in the inner pressure of the fuel tank 15 is beyond the acceptable range, the learning control of the valve opening start position of the closing valve 40 is prohibited. In this way, the ECU 19 corresponds to the means for judging pressure of this disclosure.

Figure 7:
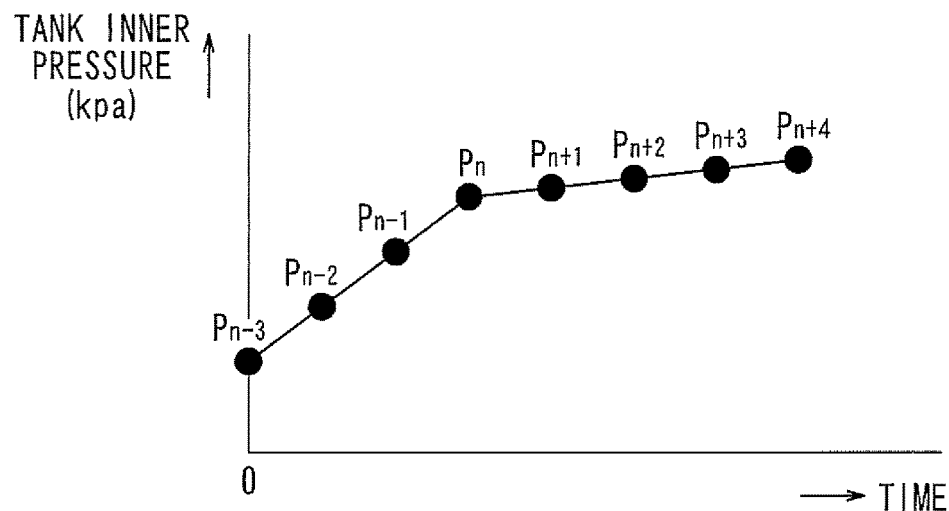
FIG. 7 is a graph illustrating the change of the inner pressure of the fuel tank.
Figure 8:
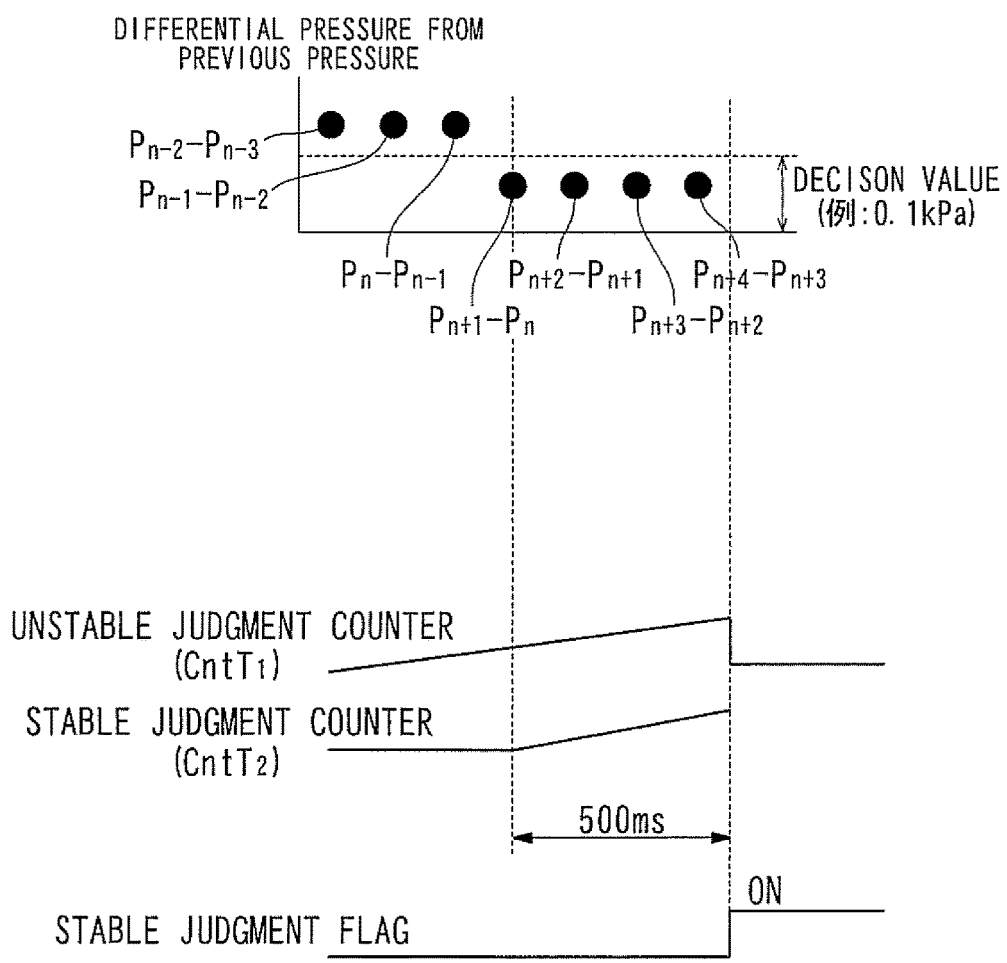
FIG. 8 is a graph illustrating an operation of a stable determination counter and an operation of an unstable determination counter, etc.
Figure 9:
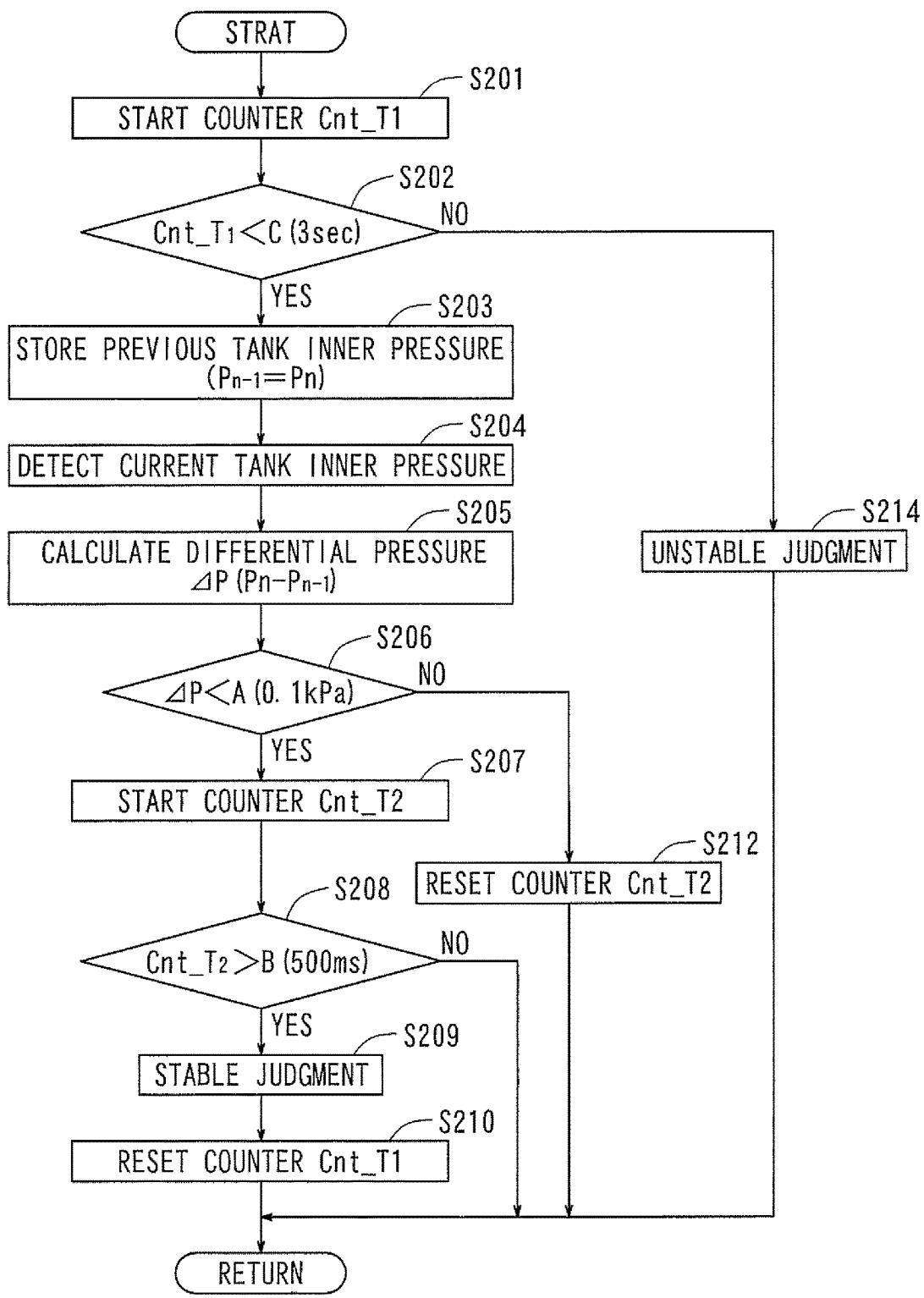
FIG. 9 is a flowchart for determining whether the fuel tank is in the tank stable state or in the tank unstable state based on the graphs of FIGS. 7 and 8.

Next, the determination of whether to perform the learning of the valve opening start position for the closing valve 40 according to a first modification will be described with reference to FIGS. 7 through 9. Here, the operation based on the flowchart of FIG. 9 is repeatedly performed at predetermined intervals based on a program stored in the storage device of the ECU 19. In the operation shown in the flowchart of FIG. 9, an unstable counter CntT1 is started at step S201. Then, the time from start of the unstable counter CntT1 is judged (step S202). Because the time judgment at step S202 is YES shortly after the start of the unstable counter CntT1, the operation progresses to steps S203-S205, and the differential pressure $\Delta P$ between the currently detected tank inner pressure (Pn) and the previously detected tank inner pressure (Pn-1) is calculated. When the differential pressure $\Delta P$ is higher than, for example, 0.1 kPa (step S206, "NO"), a stable counter CntT2 is reset (step S212), and the operation is returned to step S201. In the state that the amount of increase in the tank inner pressure is large (refer to Pn-3 through Pn-1 of FIGS. 7 and 8), the operation of steps S201-S206 and S212 is repeatedly performed. When the value of the unstable counter CntT1 is higher than, for example, 3 sec (step 202, "NO"), it is determined as a tank unstable state (unstable judgment) (step S214). That is, the amount of increase in the inner pressure of the fuel tank 15 is determined to be beyond the acceptable range, and the learning of the valve opening start position of the closing valve 40 is prohibited.

When the differential pressure $\Delta P$ is lower than, for example, 0.1 kPa (step S206 "YES") during repeat of the operation of steps S201-S206 and S212, the stable counter CntT2 is started (step S207). Then, it is determined whether the value of the stable counter CntT2 is higher than, for example, 500 ms at step S208. When the value of the stable counter CntT2 is lower than 500 ms shortly after the start of the stable counter CntT2 (step S208, "NO"), the operation is returned to step S201. In the state that the amount of increase in the tank inner pressure is small (refer to Pn through Pn+4 of FIGS. 7 and 8), the operation of steps 201-S208 is repeatedly performed. When the value of the stable counter CntT2 is higher than 500 ms (step S208, "YES"), a stable flag is turned on in order to determine to be tank stable state (stable judgment) (step S209) as shown in FIG. 8. As a result, the unstable counter CntT1 is reset (step S210). That is, it is determined that the amount of increase in the inner pressure of the fuel tank 15 is within the acceptable range and that it is in the tank stable state, and the learning control of the valve opening start position of the closing valve 40 is allowed. Accordingly, after this, the learning control of the valve opening start position of the closing valve 40 is performed.

Figure 10:
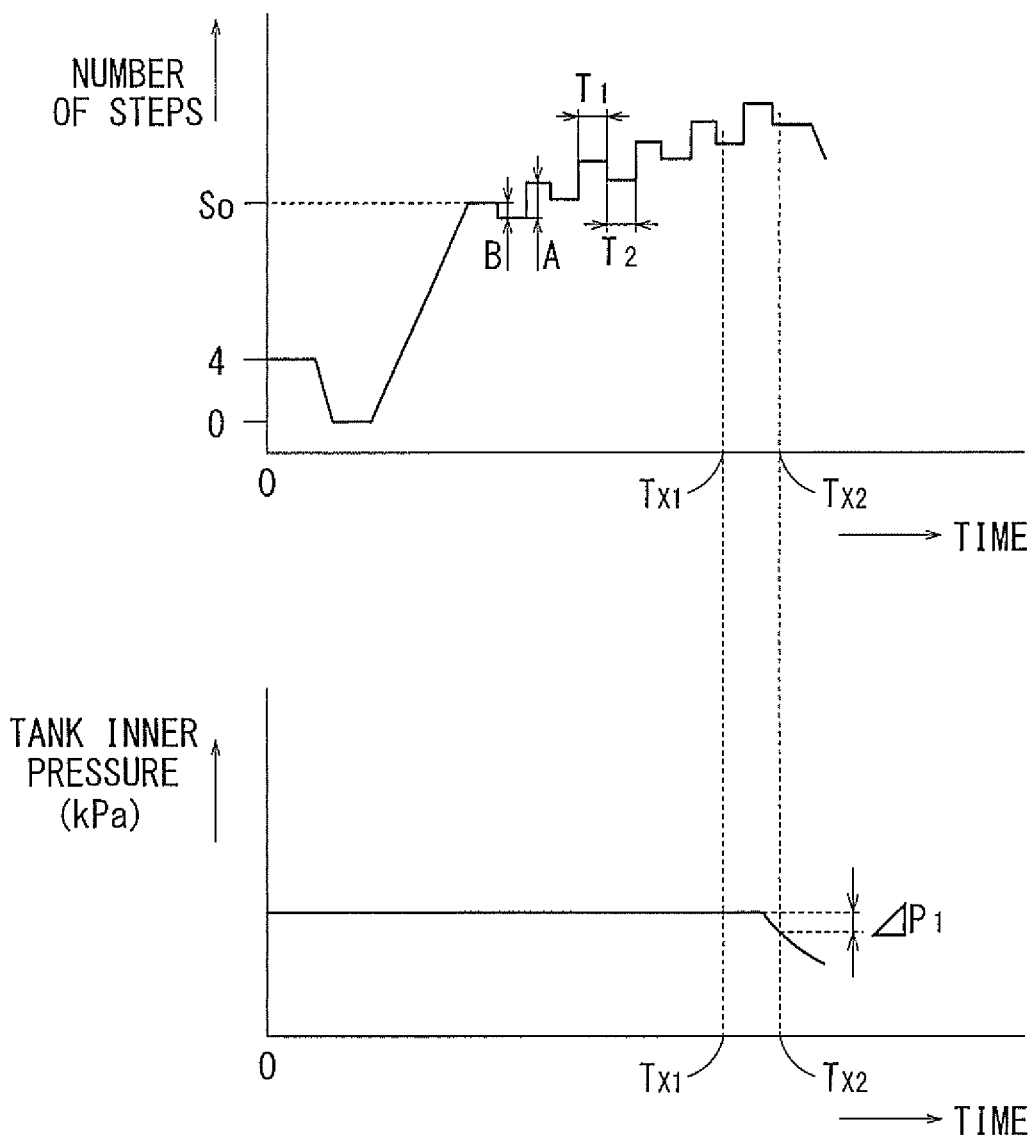
FIG. 10 is a graph illustrating the learning control for learning the valve opening start position of the closing valve.

Next, an ordinary learning control of the valve opening start position of the closing valve 40 will be described based on FIG. 10. An upper portion of FIG. 10 shows the change in the number of steps of the stepping motor 50, that is, the stroke amount (travel distance in an axial direction) of the valve guide 60 and the valve body 70 based on time (horizontal axis). Accordingly, hereinafter, the terms of the number of steps and the stroke amount will be used as synonyms. A lower portion of FIG. 10 shows the change in the inner pressure of the fuel tank 15 (tank inner pressure) based on time (horizontal axis). Here, the tank inner pressure is detected at regular intervals. As described above, while the vehicle is at rest, the stepping motor 50 is rotated by, for example, 4 steps in the valve opening direction such that the valve guide 60 is separated from the valve seat 48 of the valve casing 42 by approximately 0.1 mm. In this state, when an ignition switch of the engine is turned on, the stepping motor 50 rotates by 4 steps (-4 steps) in the valve closing direction such that the closing valve 40 is returned to the initialized state (0 step). Then, the stepping motor 50 rotates at high speed in the valve opening direction to a valve closing limit position S0 as shown in the upper portion of FIG. 10. In this state, the seal member 76 of the valve body 70 is in contact with the upper surface of the valve seat 48 of the valve casing 42 due to elastic force of the valve spring 77, so that the closing valve 40 is in the valve closing state.

When the stepping motor 50 rotates in the valve opening direction to the valve closing limit position S0 of the closing valve 40, the stepping motor 50 is stopped, and this condition is maintained for a predetermined time $T_1$ (refer to the upper portion of FIG. 10). Next, the stepping motor 50 rotates in the valve closing direction by B step (e.g., 2 steps), and this condition is maintained for a predetermined time $T_2$. While the stepping motor is maintained for the predetermined time $T_2$, the tank inner pressure is detected. At this time, when the detected tank inner pressure does not decrease by a predetermined value ($\Delta P1$) from a previously detected value, the value in which the closing valve limit position S0 step is reduced by B step (B=2), that is, (S0−2) step is stored as stroke amount. Next, the stepping motor 50 rotates in the valve opening direction by A step (e.g., 4 steps) and is maintained for the predetermined time $T_1$, and then the stepping motor 50 rotates in the valve closing direction by B step (2 steps) and is maintained for the predetermined time $T_2$. And, while the stepping motor 50 is maintained for the predetermined time $T_2$, the tank inner pressure is detected. At this time, when the tank inner pressure does not decrease by the predetermined value ($\Delta P1$) from the previously detected value, the value in which a difference between the current stroke amount A in the valve opening direction and the current stroke amount B in the valve closing amount (A−B=2 step) is added to the previous stroke amount (S0−2 step) is stored as a new stroke amount. After repeatedly performing such operation, when the currently detected tank inner pressure (refer to time Tx2) decreases not less than the predetermined value ($\Delta P1$) from the previously detected value (refer to time Tx1), it is determined that opening of the closing valve 40 is started. This calculates the learning value Sx of the valve opening start position based on the stroke amount S which has been renewed in the last process (refer to time Tx1), and the learning control is completed. In this way, because the learning control is performed after the determination to perform the learning operation, the learning control is correctly performed.

Figure 11:
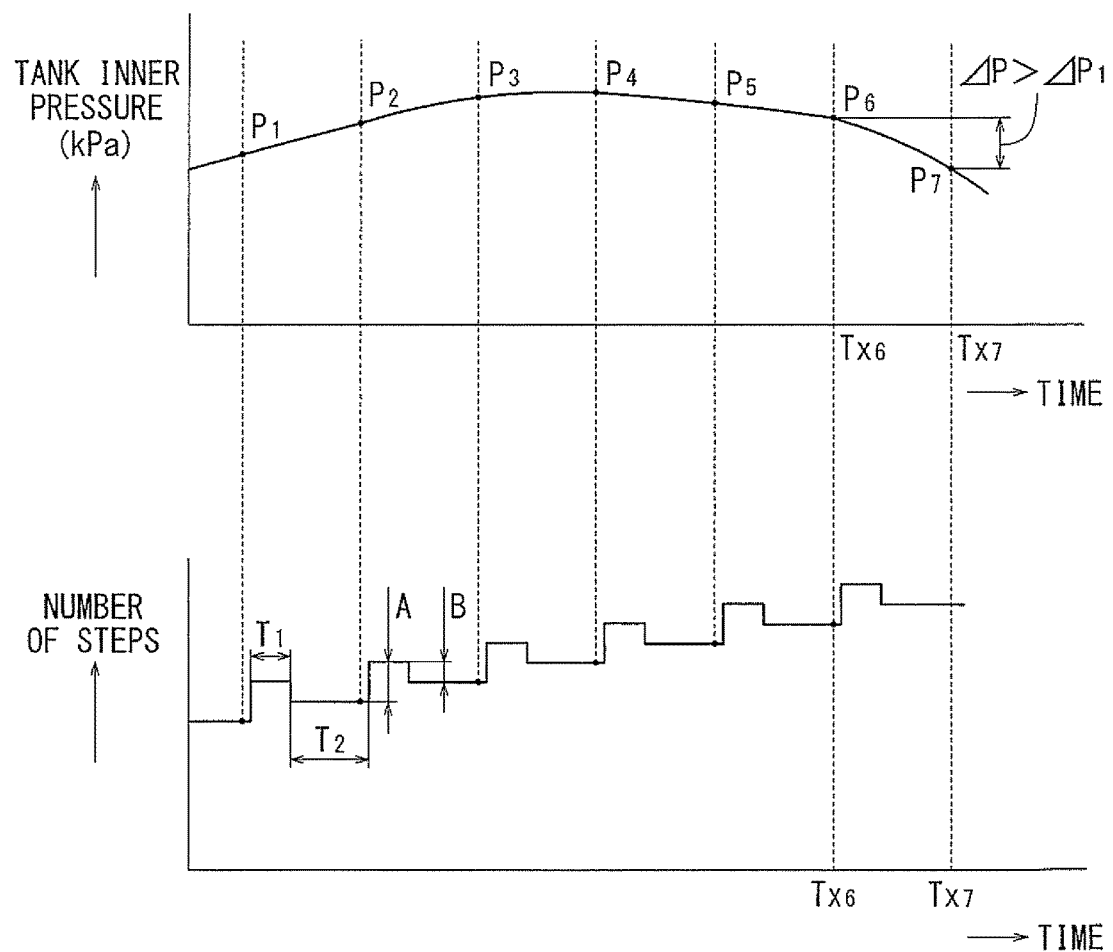
FIG. 11 is a graph illustrating the learning control of the valve opening start position of the closing valve and the timing for detecting the inner pressure of the fuel tank.

Next, the determination of whether to perform the learning of the valve opening start position for the closing valve 40 according to a second modification will be described with reference to FIGS. 11 and 12. As described above, the method in which the learning control of the closing valve 40 is performed after the determination of performance of the learning requires a long amount of time by completion of the learning control. In the determination of performance or prohibition of the learning of the closing valve 40 according to the second modification, the determination can be performed during the learning control in order to shorten the period of time by completion of the learning control. That is, in this learning control, as shown in FIG. 10, the stepping motor 50 rotates in the valve opening direction by A step (e.g., 4 steps) and is maintained for the predetermined time $T_1$, and then the stepping motor 50 rotates in the valve closing direction by B step (2 steps) and is maintained for the predetermined time $T_2$. While the stepping motor 50 is maintained for the predetermined time $T_2$, the tank inner pressure ($P_1$ through $P_7$) is detected. The tank inner pressure ($P_1$ through $P_7$) detected during a period (maintaining time $T_2$) for maintaining the stepping motor 50 for the predetermined time $T_2$ is used for both the learning control and the determination of whether to perform the learning.

Figure 12:
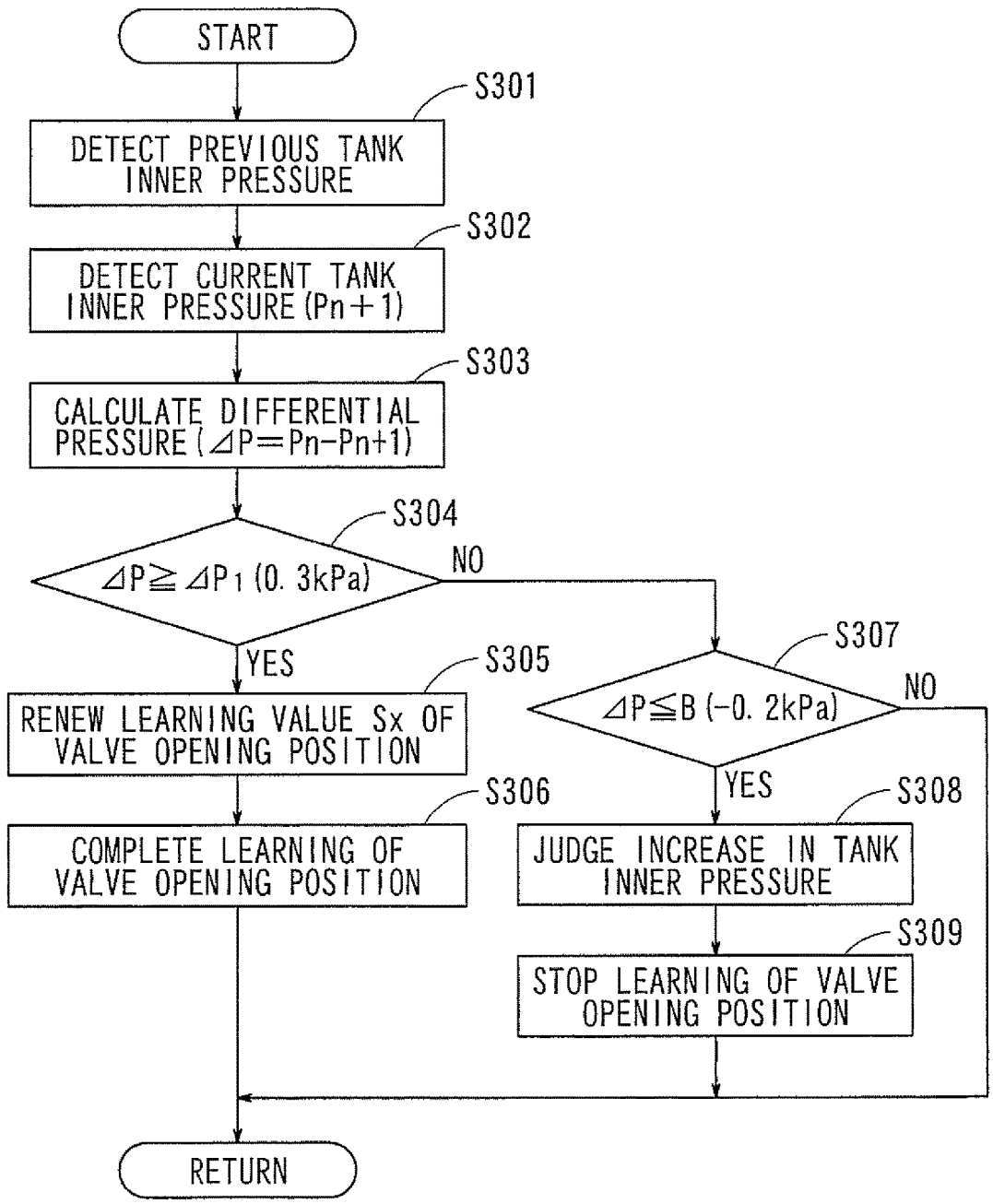
FIG. 12 is a flowchart illustrating operation of the learning control and stop determination based on the graph of FIG. 11.

That is, as shown in step S301-S303 in FIG. 12, in the learning control, the tank inner pressure $P_1$ detected during the maintaining time $T_2$ in the last process is compared with the tank inner pressure $P_2$ detected during the maintaining time $T_2$ in the current process in order to calculate the differential pressure $\Delta P$ ($=P_1-P_2$). Because $P_1$ is lower than $P_2$ as shown in FIG. 11, the differential pressure $\Delta P$ ($=P_1-P_2$) is negative, and the judgment whether $\Delta P$ is equal to or higher than $\Delta P1$ (0.3 kPa) in FIG. 12 is NO (step S304, "NO"). Thus, the operation progresses to step S307, and it is determined whether the differential pressure $\Delta P$ ($=P_1-P_2$) is equal to or lower than the decision value B or not. That is, it is determined whether the absolute value of the differential pressure $\Delta P$ is equal to or higher than the absolute value of the decision value B or not. When the absolute value of the differential pressure $\Delta P$ is equal to or higher than the absolute value of the decision value B (step S307, "YES"), the amount of increase in the tank inner pressure is judged to be beyond the acceptable range (step S308). After this, the learning control of the valve opening start position of the closing valve 40 is stopped (step S309).

When the absolute value of the differential pressure $\Delta P$ is lower than the absolute value of the decision value B (step S307, "NO"), the operation is returned to step S301. Then, in step S301-S303, the differential pressure between the tank inner pressure $P_2$ and the tank inner pressure $P_3$ is calculated. Because $P_2$ is lower than $P_3$ as shown in FIG. 11, the differential pressure $\Delta P$ ($=P_2-P_3$) is negative (step S304 in FIG. 12, "NO"), and it is determined whether the absolute value of the differential pressure $\Delta P$ ($=P_2-P_3$) is equal to or larger than the absolute value of the decision value B or not in step S307. When the absolute value of the differential pressure $\Delta P$ is smaller than the absolute value of the decision value B (step S307, "NO"), the operation is returned to step S301-S303, and then the tank inner pressure $P_3$ is compared with the tank inner pressure $P_4$. In this way, while the amount of increase in the tank inner pressure is within the acceptable range, the operation of step S301-S304 and S307 is repeatedly performed. When the differential pressure $\Delta P$ ($=Pn-Pn+1$) is positive as shown at time Tx7 in FIG. 11 and the differential pressure $\Delta P$ is higher than $\Delta P1$ (e.g., 0.3 kPa) (step S304, "YES"), the learning value of the valve opening start position of the closing valve 40 is renewed (step S305). That is, the learning value Sx of the valve opening start position is calculated based on the stroke amount renewed in the last process (Tx6) as shown in FIG. 11, and the learning control is completed (step S306). In this way, the determination of whether to perform the learning of the valve opening start position for valve 40 is performed during the learning control, and the learning value Sx is calculated in the case that the learning control is not stopped, so that the period of time by completion of the learning control can be shortened.

According to the vaporized fuel processing apparatus 20 of the present embodiment, when the ECU 19 determines that the amount of increase in the inner pressure of the fuel tank 15 is beyond the acceptable range before or during the learning of the valve opening start position of the closing valve 40, the learning of the valve opening start position of the closing valve 40 is prohibited or stopped. Thus, the learning control is not performed in a state that the amount of increase in the inner pressure of the fuel tank 15 is large, so that erroneous learning can be prevented. Further, because the learning control of the valve opening start position of the closing valve 40 and the determination of the amount of increase in the inner pressure of the fuel tank 15 (judgment whether it is within or beyond the acceptable range) can be simultaneously performed, the period of time by completion of the learning can be shortened in comparison with the case that the determination of the amount of increase in the inner pressure of the fuel tank 15 is performed before the learning.

Figure 13:
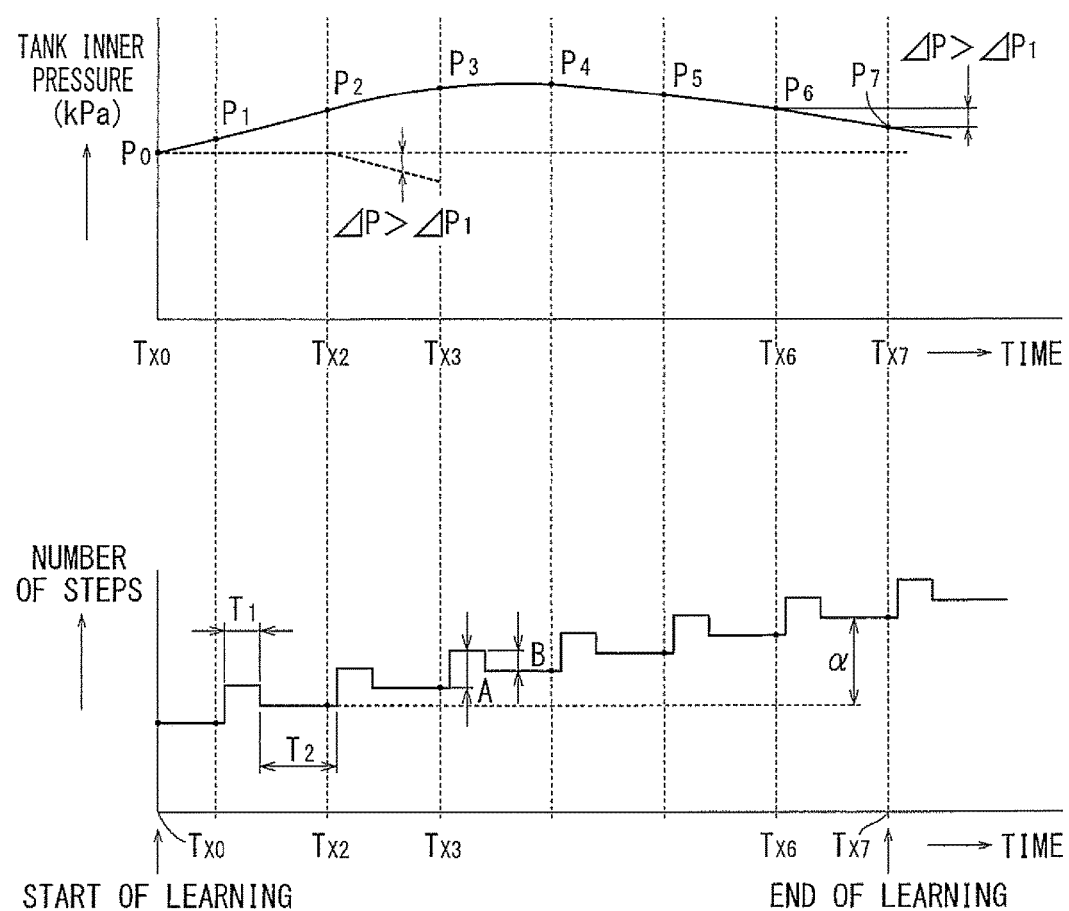
FIG. 13 is a graph illustrating the learning control of the valve opening start position of the closing valve.

Next, the vaporized fuel processing apparatus 20 according to a second embodiment will be described with reference to FIGS. 13-19. In the case of the vaporized fuel processing apparatus 20 according to the first embodiment, when the amount of increase in the inner pressure of the fuel tank 15 is beyond the acceptable range, the learning control of the valve opening start position of the closing valve 40 is stopped or is prohibited in order to prevent erroneous learning. In the case of the vaporized fuel processing apparatus 20 according to the second embodiment, if the amount of increase in the inner pressure of the fuel tank 15 is beyond the acceptable range, the learning control can be continued and the learning value of the valve opening start position of the closing valve 40 can be corrected based on the amount of increase in the inner pressure. That is, in the learning control of the vaporized fuel processing apparatus 20 according to the second embodiment, the tank inner pressure $P_0$ at start of the learning control (refer to time Tx0 in FIG. 13) is detected at step S401 in the flowchart of FIG. 14. Then, as shown in FIG. 13, the stepping motor 50 rotates in the valve opening direction by A step (e.g., 4 steps) and is maintained for the predetermined time $T_1$, and then the stepping motor rotates in the valve closing direction by B step (2 steps) and is maintained for the predetermined time $T_2$. While the stepping motor 50 is maintained for the predetermined time $T_2$, the tank inner pressure ($P_1$ through $P_7$) is detected.

Figure 14:
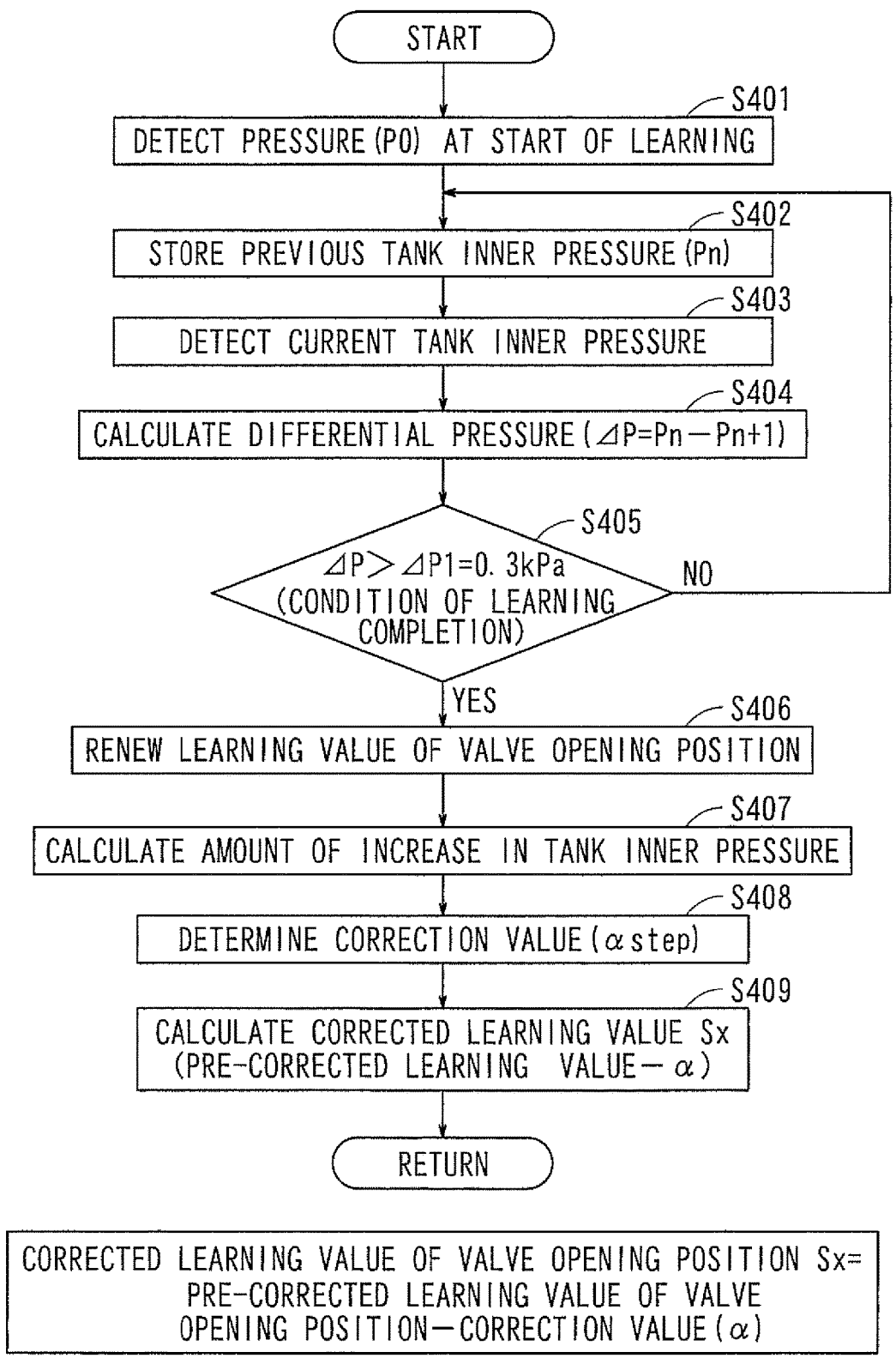
FIG. 14 is a flowchart illustrating the learning control based on the graph of FIG. 13.

The learning control in a case that the inner pressure of the fuel tank 15 does not increase as shown by the dotted line in an upper portion of FIG. 13 will be described based on the flowchart of FIG. 14. Here, the operation shown by the flowchart of FIG. 14 is repeatedly performed at predetermined intervals based on a program stored in the storage device of the ECU 19. The tank inner pressure $P_0$ at start of the learning control is stored in step S401, and each differential pressure $\Delta P$ of the tank inner pressures ($P_1$ through $P_6$) detected during the maintaining time $T_2$ is calculated (step S404). That is, at time Tx2 in FIG. 13, the differential pressure $\Delta P$ (=$P_1$–$P_2$) between the tank inner pressure $P_1$ of the last process (step S402) and the tank inner pressure $P_2$ of the current process (step S403) is calculated (step S404). In the case that the inner pressure of the fuel tank 15 does not increase (refer to the dotted line), the differential pressure $\Delta P$ (=$P_1$–$P_2$) is zero, and the differential pressure $\Delta P$ is lower than $\Delta P1$ (=0.3 kPa). Thus, because step S405 is NO, the operation is returned to step S402. Then, the tank inner pressure $P_2$ is stored (step S402), the tank inner pressure $P_3$ is detected at time Tx3 of FIG. 13, and the differential pressure $\Delta P$ (=$P_2$–$P_3$) is calculated (step S404). Because the tank inner pressure $P_3$ decreases by higher than $\Delta P1$ (=0.3 kPa) from the tank inner pressure $P_2$ of the last process at time Tx3 of FIG. 13, step S405 is YES, and the learning value of the valve opening start position is determined based on the stroke amount renewed in the last process (Tx2) (step S406).

Then, the amount of increase in the inner pressure of the fuel tank 15 is calculated based on the tank inner pressure $P_0$ at the start of the learning and the tank inner pressure $P_2$ at the end of the learning (at the start of opening of the closing valve 40) (step S407). In the case that the tank inner pressure of the fuel tank 15 does not increase (refer to the dotted line), the amount of increase in the inner pressure is zero. The correction value $\alpha$ is determined depending on the amount of increase in the inner pressure of the fuel tank 15 (step S408). The correction value $\alpha$ is determined based on a table shown in FIG. 15. That is, when the amount of increase in the inner pressure is zero, the correction value $\alpha$ is zero. Then, the learning value determined at the step S406 is reduced by the correction value $\alpha$ (=0) in order to calculate the corrected learning value Sx (step S409). That is, because the correction value $\alpha$ is zero, the pre-corrected learning value and the corrected learning value are equal to each other.

Next, a case where the tank inner pressure changes as shown by a solid line in the upper portion of FIG. 13 will be described. In this case, because the differential pressure calculated at step S404 of FIG. 14, that is, $\Delta P$=Pn−Pn+1 is negative, step S405 ($\Delta P$>$\Delta P1$ (=0.3 kPa)) is NO, and the operation of step S402-S405 is repeatedly performed. As shown at time Tx7 of FIG. 13, when the differential pressure $\Delta P$ (=P6-P7) is higher than $\Delta P1$ (=0.3 kPa) (step S405, "YES"), the learning value Sx6 of the valve opening start position is determined based on the stroke amount renewed in the last process (Tx6) (step S406). Then, the amount of increase in the inner pressure ($P_6$–$P_0$) of the fuel tank 15 is calculated based on the tank inner pressure $P_0$ at the start of the learning and the tank inner pressure $P_6$ at the end of the learning (at the start of opening of the closing valve 40) (step S407). The correction value $\alpha$ is determined based on the table of FIG. 15 (step S408). The correction value $\alpha$ depends on the amount of increase in the inner pressure. Then, the learning value Sx6 determined at step S406 is reduced by the correction value $\alpha$ in order to calculate the corrected learning value Sx (step S409). In this way, if the amount of increase in the inner pressure of the fuel tank 15 is determined to be beyond the acceptable range, the learning control can be continued, and the learning value of the valve opening start position of the closing valve 40 can be corrected based on the amount of increase in the inner pressure. That is, the ECU 19 corresponds to and includes both a calculator for the amount of increase in the inner pressure and a corrector. For example, referring briefly to FIG. 21, where a schematic example of ECU 19 shows both a calculator 225 and a corrector 226 each included within a control program 224.

Figures 15, 16:
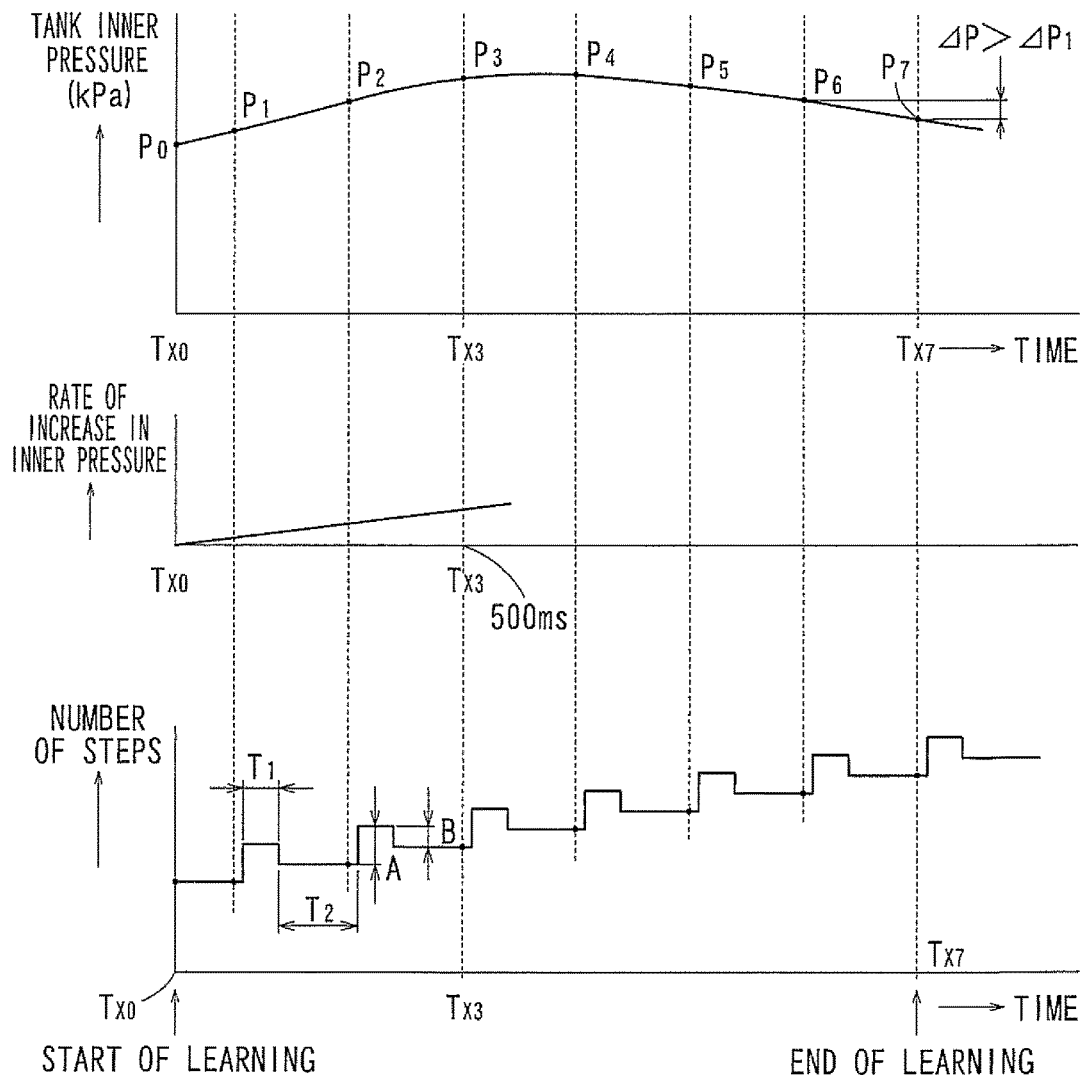
FIG. 15 is a table illustrating the relationship between the amount of increase in the inner pressure and the correction value.
FIG. 16 is a graph illustrating the learning control of the valve opening start position of the closing valve.

Next, the learning control of the valve opening start position of the closing valve 40 according to a third modification will be described with reference to FIGS. 16-20. The learning control of the valve opening start position of the closing valve 40 according to the third modification is basically same with the learning control of the second embodiment (refer to FIGS. 13-15), however, a method for calculating the amount of increase in the inner pressure of the fuel tank 15 of the third modification is different from that of the second embodiment. In the learning control according to the third modification, the tank inner pressure $P_0$ is detected at the start of the learning (time Tx0 in FIG. 16) (step S501 of FIG. 17), and then the counter Cnt is started (step S502). Further, it is determined whether setting of the correction value $\alpha$ is completed or not (step S503). Because the setting of the correction value $\alpha$ is not completed (step S503, "NO"), the operation progresses to step S504, and it is determined whether it takes 500 ms after the start of the counter Cnt or not (step S504). At time Tx0 of FIG. 16, step S504 is NO, and the learning control is performed at step S511. That is, as shown in FIG. 16, the operation, in which the stepping motor 50 rotates in the valve opening direction by A step (e.g., 4 steps) and is maintained for the predetermined time $T_1$, then the stepping motor 50 rotates in the valve closing direction by B step (2 steps) and is maintained for the predetermined time $T_2$, and while the stepping motor 50 is maintained for the predetermined time $T_2$, the tank inner pressure ($P_1$ through $P_7$) is detected, is repeatedly performed. When it takes 500 ms after the start of the counter Cnt (step S504, "YES" (refer to time Tx3 in FIG. 16)), the tank inner pressure $P_3$ is detected (step S505). Then, the differential pressure $\Delta$P500 between the tank inner pressure $P_0$ at the start of the learning and the tank inner pressure $P_3$ is calculated (step S506), and the rate of increase in the inner pressure of the fuel tank 15 during 500 ms (kPa/sec) is calculated based on the differential pressure $\Delta$P500 (step S507). The correction value $\alpha$ is set based on the rate of increase in the inner pressure (kPa/sec) (step S508).

Figure 17:
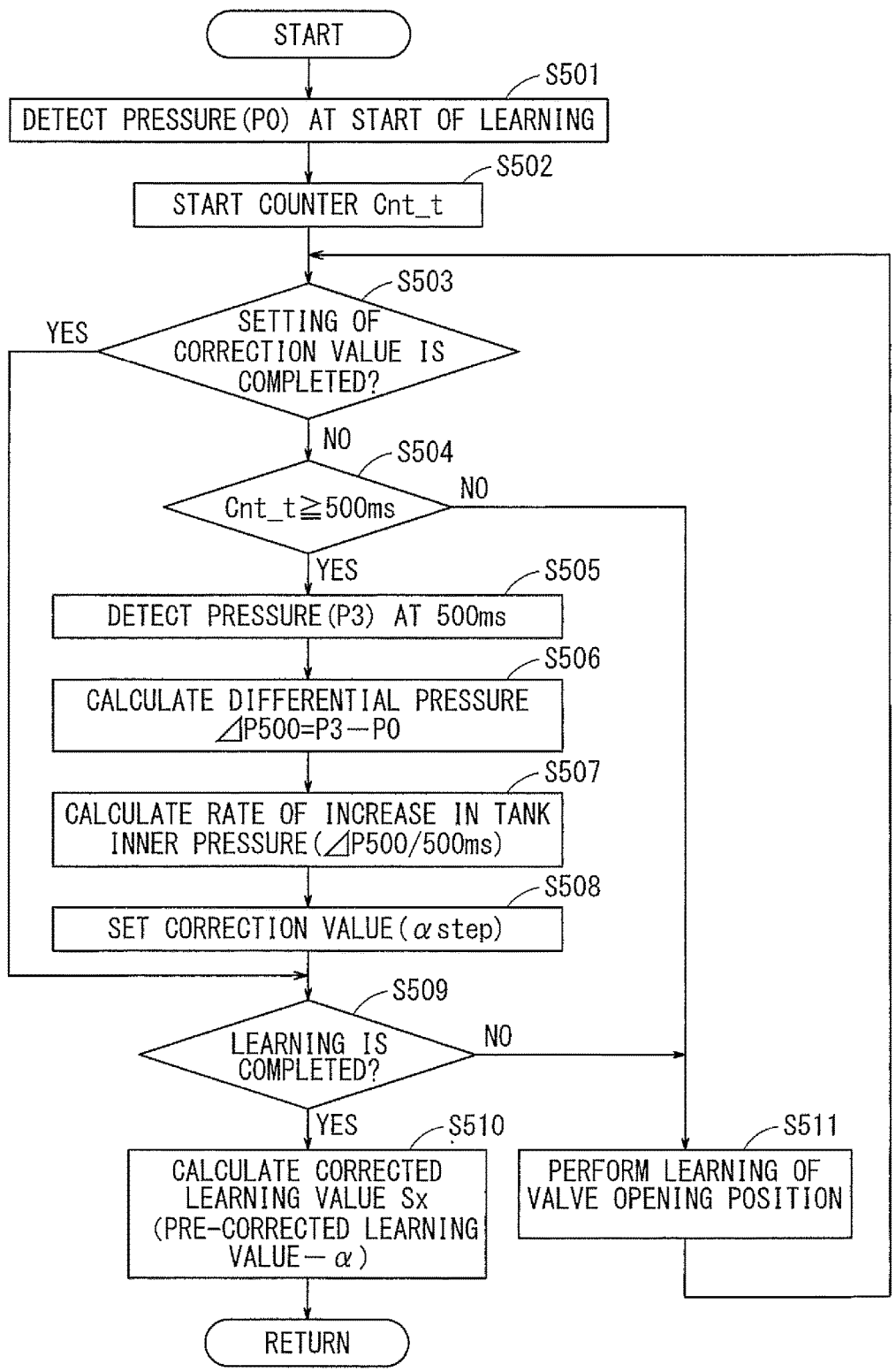
FIG. 17 is a flowchart illustrating the learning control based on the graph of FIG. 16.

In order to determine the correction value $\alpha$ based on the rate of increase in the inner pressure (kPa/sec), both a method using the graph of FIG. 18 and a method using the table of FIG. 19 can be used. By using the graph of FIG. 18 or the table of FIG. 19, when the rate of increase in the inner pressure (kPa/sec) is equal to or higher than 0 and is lower than 0.1, the correction value a is set as 1 step as shown in the table of FIG. 20. Similarly, when the rate of increase in the inner pressure (kPa/sec) is equal to or higher than 0.1 and is lower than 0.2, the correction value $\alpha$ is set as 2 steps. When the rate of increase in the inner pressure (kPa/sec) is equal to or higher than 0.2 and is lower than 0.3, the correction value $\alpha$ is set as 3 steps. When the rate of increase in the inner pressure (kPa/sec) is equal to or higher than 0.3 and is lower than 0.5, the correction value $\alpha$ is set as 4 steps. When the rate of increase in the inner pressure (kPa/sec) is equal to or higher than 0.5, the correction value $\alpha$ is set as 5 steps. Then, it is determined whether the learning control is completed or not at step S509. When the learning control is not completed (step S509, "NO"), the operation progresses to step S511, and the leaning control is performed. Then, the operation progresses to step S503, and it is determined whether the setting of the correction value α is completed or not. Because the setting of the correction value α is completed as described above (step S503, "YES"), the operation progresses to step S509 and step S511, and the learning control is continued (step S511). The operation of step S503, S509 and S511 of FIG. 17 is repeated in order to perform the learning control. When the learning control is completed as shown at time Tx7 in FIG. 16 (step S509, "YES"), the pre-corrected learning value is reduced by the correction value α in order to calculate the corrected learning value Sx (step S510).

According to the vaporized fuel processing apparatus 20 of this embodiment, the ECU 19 (corrector) corrects the learning value of the valve opening start position of the closing valve 40 based on the amount of increase in the inner pressure (the rate of increase in the inner pressure) of the fuel tank 15. That is, if the amount of increase in the inner pressure of fuel tank 15 is beyond the acceptable range, the learning control of the valve opening start position of the closing valve 40 can be performed, and erroneous learning can be prevented. Accordingly, the learning of the valve opening start position of the closing valve 40 can be quickly performed. The tank inner pressures $P_0$ and $P_6$ of the fuel tank are detected at the start of the learning and at the end of the learning (at the start of the opening of the closing valve 40), respectively, and the amount of increase in the inner pressure is calculated based on the differential pressures between them, so that the load on calculation can be reduced. Because the ECU 19 (corrector) stores a plurality of pairs of the rates of increase in the inner pressure of the fuel tank 15 during the predetermined period of time and the corrected stroke amounts (correction values α) of the closing valve 40, which have been set depending on the corresponding rates of increase in the inner pressure, the ECU 19 elects the corrected stroke amount (correction value α) corresponding to the actual rate of increase in the inner pressure from the plurality of the pairs of the rates of increase in the inner pressure and the corrected stroke amounts (correction value α), which are stored in the ECU 19, in order to correct the learning value of the valve opening start position of the closing valve 40. Accordingly, the learning value Sx of the valve opening start position of the closing valve 40 can be corrected with high accuracy.

Figure 21:
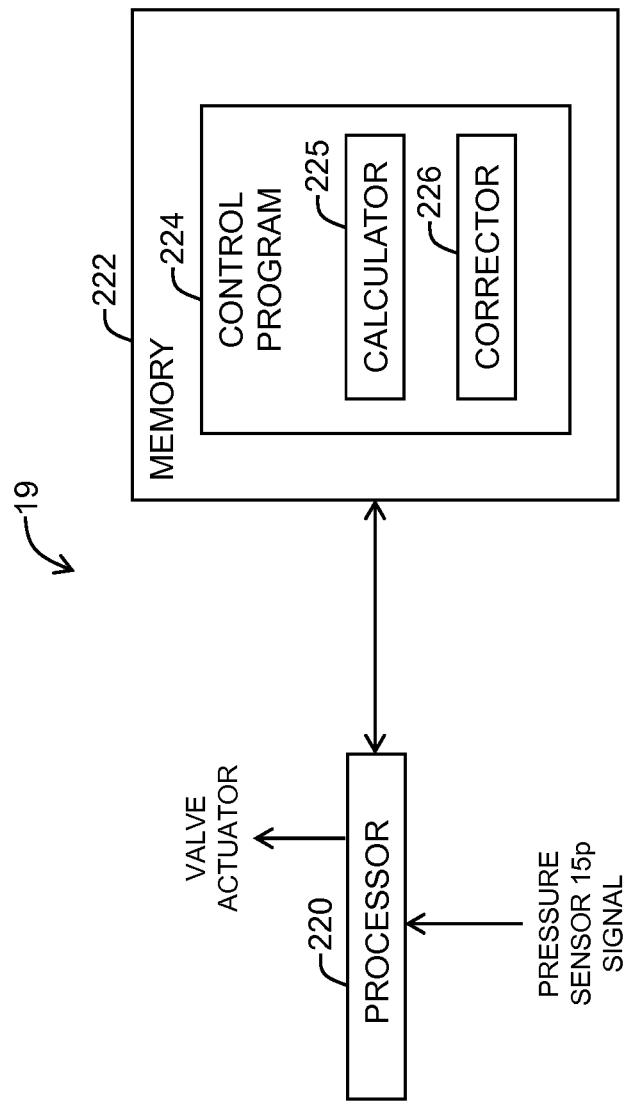
FIG. 21 is a block diagram of an example of a controller to learn a valve opening start position as disclosed herein.

FIG. 21 shows an example of the ECU 19. In this example, the ECU 19 includes a processor 220 coupled to memory 222. Memory 222 includes a control program 224 which is executable by the processor 220. In this embodiment, control program 224 includes both a calculator 225 and a corrector 226 as previously described above. When the control program 224 is executed, the processor 220 performs any or all of the various functions described herein as attributed to the ECU 19.

For example, the control program 224 may cause the processor 220 to: (i) determine whether an amount of increase in the inner pressure of the fuel tank 15 (e.g., as measured by sensor 15p) is within an acceptable range; (ii) learn the valve opening start position of a closing valve (e.g., valve 40) based on the stroke amount or distance between a valve movable portion (e.g., valve guide 60) when the inner pressure of the fuel tank is reduced by an amount greater than or equal to a predetermined value through increasing the stroke amount; and (iii) stop or prohibit the learning of the valve opening start position in (ii) when the amount of the increase of the inner pressure of the fuel tank is not within the acceptable range during or before the learning of the valve opening start position in accordance with the principles disclosed herein.

As another example, the control program 224 may cause the processor 220 to: (i) calculate the amount of increase in the inner pressure of the fuel tank 15 (e.g., based on the measurements from sensor 15p); (ii) determine whether the amount of increase in the inner pressure of the fuel tank 15 is within an acceptable range; (iii) learn the valve opening start position of a closing valve (e.g., valve 40) based on the stroke amount or distance of a movable valve portion (e.g., valve guide 60) when the inner pressure of the fuel tank 15 is reduced by an amount greater than or equal to a predetermined value through increasing the stroke amount; and (iv) correct the valve opening start position based on the amount of increase in the inner pressure as calculated in (i) in accordance with the principles disclosed herein.

The vaporized fuel processing apparatus 20 can be further modified without departing from the scope of the disclosure. For example, in the first and second embodiments, the learning control is performed while repeatedly performing the operation, in which the stepping motor 50 rotates in the valve opening direction by A step (e.g., 4 steps) and is maintained for the predetermined time $T_1$, the stepping motor 50 rotates in the valve closing direction by B step (2 steps) and is maintained for the predetermined time $T_2$, and while the stepping motor 50 is maintained for the predetermined time $T_2$, the tank inner pressure ($P_1$ through $P_7$) is detected. However, for example, the learning control can be performed while repeatedly performing the operation, in which the stepping motor 50 rotates in the valve opening direction by B step (2 steps) and is maintained for the predetermined time $T_2$, and while the stepping motor 50 is maintained for the predetermined time $T_2$, the tank inner pressure ($P_1$ through $P_7$) is detected. Although the stepping motor 50 is used as the motor for the closing valve 40 in these embodiments, a DC motor or the like can be used instead of the stepping motor 50. It should be appreciated that the stroke amount described herein can be decided and/or detected based on, for example, a value detected by a stroke sensor, or, in embodiments which utilize a stepping motor (e.g., motor 50) the number of steps of the stepping motor.

The invention claimed is:

1. A vaporized fuel processing apparatus comprising:
   a canister capable of adsorbing vaporized fuel generated in a fuel tank;
   a vapor path connecting the canister and the fuel tank to each other;
   a closing valve provided in the vapor path and having a valve seat and a valve movable portion, the valve movable portion having an axis and being capable of moving in an axial direction of the valve movable portion respect to the valve seat, the closing valve being in a valve closing state capable of maintaining the fuel tank in a hermetic state when a stroke amount which is an axial distance between the valve movable portion and the valve seat is within a predetermined range as from zero;
   a pressure sensor configured to detect inner pressure of the fuel tank; and
   an electric control unit configured to:
      determine whether an amount of increase in the inner pressure of the fuel tank is within an acceptable range;

learn a valve opening start position of the closing valve based on the stroke amount when the inner pressure of the fuel tank is reduced by an amount greater than or equal to a predetermined value through increasing the stroke amount; and stop or prohibit the learning of the valve opening start position of the closing valve when the amount of increase in the inner pressure of the fuel tank is not within the acceptable range during or before the learning of the valve opening start position of the closing valve.

2. The vaporized fuel processing apparatus according to claim 1, wherein the electric control unit is configured to calculate a differential pressure based on the inner pressures of the fuel tank detected at predetermined intervals, and to determine that the amount of increase in the inner pressure of the fuel tank is not within the acceptable range when the differential pressure is higher than a predetermined decision value.

3. The vaporized fuel processing apparatus according to claim 1, wherein the electric control unit is configured to calculate a differential pressure based on the inner pressure of the fuel tank detected at predetermined intervals, and to determine that the amount of increase in the inner pressure of the fuel tank is not within the acceptable range when the differential pressure is higher than a predetermined decision value for a first predetermined period of time.

4. The vaporized fuel processing apparatus according to claim 1, wherein the electric control unit is configured to repeatedly:
increase the stroke amount of the closing valve by a predetermined amount;
maintain a position of the closing valve for a predetermined period of time; and
detect the inner pressure of the fuel tank while maintaining the position of closing valve; and wherein the electronic control unit is configured to determine whether the amount of increase in the inner pressure of the fuel tank is within the acceptable range based on a differential pressure between two successively detected pressures of the inner pressures of the fuel tank.

5. The vaporized fuel processing apparatus according to claim 1, wherein the electric control unit is configured to start the learning of the valve opening start position of the closing valve when the electric control unit determines that the amount of increase in the inner pressure of the fuel tank is within the acceptable range.

6. The vaporized fuel processing apparatus according to claim 5, wherein the electric control unit is configured to calculate a differential pressure based on the inner pressures of the fuel tank, which are detected at the predetermined intervals, and to determine that the amount of increase in the inner pressure of the fuel tank is within the acceptable range when the differential pressure is lower than a predetermined decision value for a second predetermined period of time.

7. A vaporized fuel processing apparatus comprising:
a canister capable of adsorbing vaporized fuel generated in a fuel tank;
a vapor path connecting the canister and the fuel tank to each other;
a closing valve provided in the vapor path and having a valve seat and a valve movable portion, the valve movable portion having an axis and being capable of moving in an axial direction of the valve movable portion respect to the valve seat, the closing valve being in a valve closing state capable of maintaining the fuel tank in a hermetic state when a stroke amount, which is an axial distance between the valve movable portion and the valve seat, is within a predetermined range as from zero;
a pressure sensor configured to detect an inner pressure of the fuel tank;
a processor configured to learn a valve opening start position based on the stroke amount as a learning value that is the stroke amount at the valve opening start position when the inner pressure of the fuel tank is reduced by an amount greater than or equal to a predetermined value through increasing the stroke amount;
a calculator configured to calculate the amount of increase in the inner pressure of the fuel tank based on the inner pressure detected by the pressure sensor, and
a corrector configured to correct the learning value based on the amount of increase in the inner pressure.

8. The vaporized fuel processing apparatus according to claim 7, wherein the calculator is configured to calculate the amount of increase in the inner pressure of the fuel tank based on the inner pressure of the fuel tank at the start of the learning of the valve opening start position of the closing valve and the inner pressure of the fuel tank at the start of opening of the closing valve.

9. The vaporized fuel processing apparatus according to claim 7, wherein the corrector is configured to correct the learning value based on the amount of increase in the inner pressure of the fuel tank for a predetermined period of time.

10. The vaporized fuel processing apparatus according to claim 9, wherein the corrector stores a plurality of pairs of the amounts of increase in the inner pressure and corrected stroke amounts of the closing valve, which are preset depending on the corresponding amounts of increase in the inner pressure; and wherein the corrector is configured to correct the learning value by electing the corrected stroke amount corresponding to the calculated amount of increase in the inner pressure from the plurality of the pairs of the amounts of increase in the inner pressure and the corrected stroke amounts.

11. A fuel vapor control device, comprising:
memory containing a control program; and
a processor coupled to the memory and configured to execute the control program;
wherein, upon executing the control program, the processor is to:
determine whether an amount of increase in an inner pressure of a fuel tank is within an acceptable range;
learn a valve opening start position of a closing valve disposed along a vapor path extending between a canister and the fuel tank based on a stroke amount, which is an axial distance between a valve movable portion and a valve seat within the closing valve, when the inner pressure of the fuel tank is reduced by an amount greater than or equal to a predetermined value through increasing the stroke amount; and stop or prohibit the learning of the valve opening start position when the amount of increase of the inner pressure of the fuel tank is not within the acceptable range during or before the learning of the valve opening start position.

12. A fuel vapor control device, comprising:

memory containing a control program; and a processor coupled to the memory and configured to execute the control program;

wherein, upon executing the control program, the processor is to:

calculate an amount of increase in an inner pressure of a fuel tank;

determine whether the amount of increase in the inner pressure of the fuel tank is within an acceptable range;

learn a valve opening start position of a closing valve disposed along a vapor path extending between a canister and the fuel tank based on a stroke amount, which is an axial distance between a valve movable portion and a valve seat within the closing valve, when the inner pressure of the fuel tank is reduced by an amount greater than or equal to a predetermined value through increasing the stroke amount; and correct the valve opening start position based on the amount of increase in the inner pressure.

* * * * *